United States Patent
Nangia

(10) Patent No.: US 10,369,478 B2
(45) Date of Patent: *Aug. 6, 2019

(54) SYSTEM AND METHOD FOR PROVIDING SECONDARY GAMING

(71) Applicant: Rishi Nangia, Arlington, VA (US)

(72) Inventor: Rishi Nangia, Arlington, VA (US)

(73) Assignee: Rishi Nangia, Arlington, VA (US)

( * ) Notice: Subject to any disclaimer, the term of this patent is extended or adjusted under 35 U.S.C. 154(b) by 16 days.

This patent is subject to a terminal disclaimer.

(21) Appl. No.: 15/808,148

(22) Filed: Nov. 9, 2017

(65) Prior Publication Data

US 2018/0065050 A1    Mar. 8, 2018

Related U.S. Application Data

(63) Continuation of application No. 13/038,122, filed on Mar. 1, 2011, now Pat. No. 9,855,503.

(60) Provisional application No. 61/309,150, filed on Mar. 1, 2010.

(51) Int. Cl.
G07F 17/32     (2006.01)
A63F 13/828    (2014.01)

(52) U.S. Cl.
CPC ............ *A63F 13/828* (2014.09); *G07F 17/32* (2013.01); *G07F 17/3234* (2013.01); *G07F 17/3272* (2013.01); *G07F 17/3281* (2013.01)

(58) Field of Classification Search
CPC ........ G06Q 40/06; G06Q 50/34; G07F 17/32; G07F 17/3288
USPC .................................................... 463/40–42
See application file for complete search history.

(56) References Cited

U.S. PATENT DOCUMENTS

| | | | |
|---|---|---|---|
| 4,918,603 A | 4/1990 | Huges et al. |
| 5,018,736 A | 5/1991 | Pearson et al. |
| 5,263,723 A | 11/1993 | Pearson et al. |
| 5,346,326 A | 9/1994 | Bienvenu |
| 5,788,283 A | 8/1998 | Adler |

(Continued)

FOREIGN PATENT DOCUMENTS

WO    WO 2006/122105 A2    11/2006

OTHER PUBLICATIONS

Mike Butcher, "HubDub closes news site to focus on fantasy sports spinoff FanDuel," Apr. 14, 2010, available at https://techcrunch.com/2010/04/14/hubdub-closes-news-site-to-focus-on-fantasy-sports-spinoff-fanduel/ (last accessed Dec. 13, 2016).

(Continued)

*Primary Examiner* — David L Lewis
*Assistant Examiner* — Ross A Williams
(74) *Attorney, Agent, or Firm* — Bookoff McAndrews, PLLC

(57) ABSTRACT

A system and method for providing secondary gaming for fantasy sports to provide more interactive, robust and comprehensive fantasy sports gaming. A secondary game involves one or more fantasy sports players, one or more statistics to measure fantasy performance of the players, one or more time period in which to evaluate the fantasy player, and a game value amount, which is the consideration contested in the fantasy game. Accordingly, Users may place wagers on the expected performance of fantasy players or teams in a fantasy league regardless of whether the party is a participant in the league. The system may be functionally connected to the league software manager to provide real-time registration, submission, monitoring, and submission of second games.

20 Claims, 29 Drawing Sheets

(56) References Cited

U.S. PATENT DOCUMENTS

| | | | |
|---|---|---|---|
| 5,830,069 | A | 11/1998 | Soltesz et al. |
| 5,846,132 | A | 12/1998 | Junkin |
| 5,860,862 | A | 1/1999 | Junkin |
| 5,971,854 | A | 10/1999 | Pearson et al. |
| 6,135,881 | A | 10/2000 | Abbott et al. |
| 6,170,829 | B1 | 1/2001 | Harvey |
| 6,193,610 | B1 | 2/2001 | Junkin |
| 6,371,855 | B1 | 4/2002 | Gavriloff |
| 6,415,188 | B1 | 7/2002 | Fernandez et al. |
| 6,434,398 | B1 | 8/2002 | Inselberg |
| 6,471,207 | B1 | 10/2002 | Schlaifer |
| 6,650,903 | B2 | 11/2003 | Inselberg |
| 6,656,042 | B2 | 12/2003 | Reiss et al. |
| 6,669,565 | B2 | 12/2003 | Liegey |
| 6,688,973 | B2 | 2/2004 | Satloff et al. |
| 6,760,595 | B2 | 7/2004 | Inselberg |
| 6,832,178 | B1 | 12/2004 | Fernandez et al. |
| 6,922,664 | B1 | 7/2005 | Fernandez et al. |
| 6,961,537 | B2 | 11/2005 | Rajaram |
| 6,975,878 | B2 | 12/2005 | Inselberg |
| 6,996,413 | B2 | 2/2006 | Inselberg |
| 7,001,279 | B1 | 2/2006 | Barber et al. |
| 7,051,022 | B1 | 5/2006 | Faisal |
| 7,669,707 | B2 | 3/2010 | Kenneway |
| 2001/0034635 | A1 | 10/2001 | Winters |
| 2001/0034643 | A1 | 10/2001 | Acres |
| 2001/0039210 | A1 | 11/2001 | St.-Denis |
| 2001/0044336 | A1 | 11/2001 | Reiss et al. |
| 2002/0029381 | A1 | 3/2002 | Inselberg |
| 2002/0034980 | A1 | 3/2002 | Lemmons et al. |
| 2002/0049783 | A1 | 4/2002 | Berk et al. |
| 2002/0059094 | A1 | 5/2002 | Hosea et al. |
| 2002/0065097 | A1 | 5/2002 | Brockenbrough et al. |
| 2002/0069161 | A1 | 6/2002 | Eckert et al. |
| 2002/0077952 | A1 | 6/2002 | Eckert et al. |
| 2002/0077961 | A1 | 6/2002 | Eckert et al. |
| 2002/0107073 | A1 | 8/2002 | Binney |
| 2002/0107590 | A1 | 8/2002 | Liegey |
| 2002/0115488 | A1 | 8/2002 | Berry et al. |
| 2002/0116297 | A1 | 8/2002 | Olefson |
| 2002/0157099 | A1 | 10/2002 | Schrader et al. |
| 2002/0157101 | A1 | 10/2002 | Schrader et al. |
| 2002/0166123 | A1 | 11/2002 | Schrader et al. |
| 2003/0004887 | A1 | 1/2003 | Roszak |
| 2003/0014277 | A1 | 1/2003 | Kinney |
| 2003/0018571 | A1 | 1/2003 | Eckert et al. |
| 2003/0054885 | A1 | 3/2003 | Pinto et al. |
| 2003/0055713 | A1 | 3/2003 | Pinto et al. |
| 2003/0107173 | A1 | 6/2003 | Satloff et al. |
| 2003/0110480 | A1 | 6/2003 | Rajaram |
| 2003/0144017 | A1 | 7/2003 | Inselberg |
| 2003/0189589 | A1 | 10/2003 | LeBlanc et al. |
| 2003/0203757 | A1 | 10/2003 | Chanda et al. |
| 2004/0047287 | A1 | 3/2004 | Tremblay et al. |
| 2004/0058697 | A1 | 3/2004 | Inselberg |
| 2004/0073437 | A1 | 4/2004 | Halgas, Jr. et al. |
| 2004/0110552 | A1 | 6/2004 | Del Prado |
| 2004/0117831 | A1 | 6/2004 | Ellis et al. |
| 2004/0171381 | A1 | 9/2004 | Inselberg |
| 2004/0259577 | A1 | 12/2004 | Ackley |
| 2004/0266530 | A1 | 12/2004 | Bishop |
| 2004/0266535 | A1 | 12/2004 | Reeves |
| 2005/0001837 | A1 | 1/2005 | Shannon |
| 2005/0022686 | A1 | 2/2005 | Wessells et al. |
| 2005/0049731 | A1 | 3/2005 | Dell |
| 2005/0049933 | A1 | 3/2005 | Upendran et al. |
| 2005/0049957 | A1 | 3/2005 | Vakili et al. |
| 2005/0050022 | A1 | 3/2005 | Dukes et al. |
| 2005/0050160 | A1 | 3/2005 | Upendran et al. |
| 2005/0050576 | A1 | 3/2005 | Upendran et al. |
| 2005/0064937 | A1 | 3/2005 | Ballman |
| 2005/0075983 | A1 | 4/2005 | St.-Denis |
| 2005/0076362 | A1 | 4/2005 | Dukes et al. |
| 2005/0076363 | A1 | 4/2005 | Dukes et al. |
| 2005/0076364 | A1 | 4/2005 | Dukes et al. |
| 2005/0076383 | A1 | 4/2005 | Upendran et al. |
| 2005/0076384 | A1 | 4/2005 | Upendran et al. |
| 2005/0116422 | A1 | 6/2005 | Fish |
| 2005/0137728 | A1 | 6/2005 | Guagliardo |
| 2005/0159220 | A1 | 7/2005 | Wilson et al. |
| 2005/0164792 | A1 | 7/2005 | Wilcock |
| 2005/0172323 | A1 | 8/2005 | Yang et al. |
| 2005/0228780 | A1 | 10/2005 | Diab et al. |
| 2005/0239549 | A1 | 10/2005 | Salvatore et al. |
| 2006/0010251 | A1 | 1/2006 | Mrsic-Flogel et al. |
| 2006/0025208 | A1 | 2/2006 | Ramsey |
| 2006/0031106 | A1 | 2/2006 | Browde |
| 2006/0040719 | A1 | 2/2006 | Plimi |
| 2006/0041550 | A1 | 2/2006 | Bennett et al. |
| 2006/0041553 | A1 | 2/2006 | Paczkowski et al. |
| 2006/0041562 | A1 | 2/2006 | Paczkowski et al. |
| 2006/0046807 | A1 | 3/2006 | Sanchez |
| 2006/0063519 | A1 | 3/2006 | Rajaram |
| 2006/0068824 | A1 | 3/2006 | Inselberg |
| 2006/0079312 | A1 | 4/2006 | Penrice |
| 2006/0085259 | A1 | 4/2006 | Nicholas et al. |
| 2006/0089935 | A1 | 4/2006 | Clifford et al. |
| 2006/0094409 | A1 | 5/2006 | Inselberg |
| 2006/0095148 | A1 | 5/2006 | Bowman et al. |
| 2006/0095331 | A1 | 5/2006 | O'Malley et al. |
| 2006/0095344 | A1 | 5/2006 | Nakfoor |
| 2006/0100006 | A1 | 5/2006 | Mitchell et al. |
| 2006/0217198 | A1 | 9/2006 | Johnson |
| 2006/0252476 | A1 | 11/2006 | Bahou |
| 2007/0004516 | A1 | 1/2007 | Jordan et al. |
| 2010/0279754 | A1 | 11/2010 | Tanenbaum |
| 2012/0115585 | A1 | 5/2012 | Goldman et al. |
| 2012/0276990 | A1 | 11/2012 | Arezina et al. |

OTHER PUBLICATIONS

"Fantasy Sports League Website," Sep. 25, 2009, available at http://fanduel.appappeal.com/ (last accessed Dec. 13, 2016).

Nando Difino, "Everyday Fantasies," Mar. 5, 2010, available at http://www.wsj.com/articles/SB10001424052748703915204575103652233621286.

Cameron, "New to Daily Fantasy Games?," available at https://rotoorinders.com/articles/new-to-daily-fantasy-games-113 (last accessed Dec. 13, 2016).

Yahoo Fantasy Baseball Rules (Head-2-Head), at http://help.yahoo.com/l/us/yahoo/baseball/rules/index.html.

NHL—Fantasy Format, at http://benchboss.nhl.com/boss_s/display1.asp?gameid=31&page=rules.

NASCAR—Yahoo, at http://help.yahoo.com/l/us/yahoo/racing/rules/rrules-01.html.

Fantasy Golf—Yahoo, at http://help.yahoo_com/l/us/yahoo/golf/rules/grules-01.html.

Premier League Format—ESPN, from ESPN, undated.

Fantasy Football (American), from Wikipedia, the free encyclopedia, Sep. 2006.

Examiner's Affidavit, from PCT International Search Report in International Application No. PCT/US06/17886, filed on May 9, 2006.

FanDuel: Daily Fantasy Football, MLB, NBA, NHL Leagues for Cash | FanDuel, The Leader in One-Day Fantasy Sports, 2 pages, FanDuel Inc, New York City, https://www.fanduel.com.

BackYourSmack

Sign In | Register

My Games | Network | Advisor | Settings

How To Back Your Smack?

PLAY

Me — V. — John G. <link>

Duration: Weeks 1-3 | Weeks 4-6

WR: Reggie Wayne | IND

Start Date: September 8, 2010
End Date: October 21, 2010

Parameter: Fantasy Points 5 pts

EXPIRED

Ad | Ad | Ad

About | Privacy Policy | Terms of Use | Feedback

©2010 BackYourSmack.com

SYSTEM AND METHOD FOR PROVIDING SECONDARY GAMING

CROSS-REFERENCE TO RELATED APPLICATIONS

This application is a continuation of U.S. application Ser. No. 13/038,122, filed Mar. 1, 2011, which claims priority to U.S. Provisional Patent Application No. 61/309,150, filed Mar. 1, 2010, all of which are incorporated in their entireties herein by reference.

FIELD OF THE INVENTION

The invention relates to a system and method for providing enhanced features and functionality to gaming, particularly fantasy sports gaming and non-participant gaming. The invention also broadly relates to establishing secondary and/or supplementary competitions in or across one or more fantasy leagues or for non-participants in competitions.

BACKGROUND OF THE INVENTION

It is believed fantasy sports first started around the 1940's. Since that time, fantasy sports and gaming have gained popularity, expanding to most sports. The Internet boom of the late 1990's created a revolution in the game. Enabling gamers to easily compute statistics and monitor their teams brought Rotisserie baseball into the fantasy sports industry that we know today. It is estimated by the Fantasy Sports Trade Association that 16 million U.S. adults played fantasy sports in 2006 and 22 percent of U.S. adult males 18 to 49 years old, with Internet access, play fantasy sports. Fantasy Sports are estimated to have a $3-4 billion annual economic impact across the sports industry. Fantasy sports are also popular throughout the world with leagues for soccer (known as football outside of the United States), cricket and other non-U.S. based sports.

Generally, fantasy sports (also known as rotisserie, roto, or fairy-tale sport; or owner simulation) conventionally include one or more games in which fantasy owners build a team that competes against other fantasy owners based on the statistics generated by individual players or teams of a professional sport. A fantasy team is typically comprised of at least one real-life person, most commonly a public figure and/or professional athlete, whose performance may be measured and/or quantified, and then translated into points attributable to a fantasy team. In most formats, statistical performance is converted into points, the conversion of which may be customizable for each league, that are compiled and totaled according to a roster selected by a manager that makes up a fantasy team. Point systems are typically calculated manually by the fantasy owners, including perhaps a "league commissioner" or are automated using use computer modeling of actual games based on statistical input generated by professional sports. In fantasy sports there is the ability to trade, cut, and sign players, like a real sports owner.

Fantasy sports leagues are generally of two different formats that are generally known in the art: rotisserie and head-to-head. In both formats, the competition is primarily focused on determining an overall winner over the course of season of one or more professional sports. Rotisserie fantasy sports are characterized by having one or more predetermined categories of statistics in which all of the teams of the league compared. In convention leagues, in each statistical category, the teams are ranked and given a point values accordingly. In the head-to-head format, a first fantasy team plays, i.e., competes directly against, a second fantasy team (as opposed to the entire league in the rotisserie style).

The current fantasy sports paradigm is limited, however. First, fantasy sports are designed to for competition only between a finite number of teams, commonly between 4-30 fantasy teams that comprise the fantasy league. As a result, those who wish to participate but are not part of the league cannot. Second, each fantasy league is designed to award an overall winner, a perhaps a limited subset of winners from the league (like second or third place), based on wins and losses, and perhaps supplementary winner determined by a playoff system that also involves wins/losses or overall statistical points. There is presently no automated, real-time competition system within or among fantasy leagues that ordinarily and regularly calculates any statistic, besides wins/losses or total points, to compare fantasy teams. Consequently, fantasy teams that are not performing well over the course of a season, i.e., out of contention, often suffer from waning interest in the league over the course of the season. In other words, a team that has no chance of winning the league effectively has nothing to play for.

Professional gambling industries have developed methods and systems to provide an array of entertainment to sports fans. For example, even when a fan's favorite team is out of contention for a season championship, the fan can maintain interest by placing side wagers or prop bets, which are secondary to his favorite team's overall record and chances of a championship, where applicable and allowed by law. The can bet on the performance by the team from game to game, performance of players, or and any other measurable statistic. Professional gambling applies to large, publicly recognized sports with mass public appeal. However, no system is available that identifies individual fantasy leagues as a pool and source of secondary gaming and side bets.

Certain publicly offered gambling services, such as Fantasy Sports Exchange <http://www.wsex.com> and Casino Station in Las Vegas, Nev. have introduced betting on player statistics rather than outcomes of games, particularly for players in the National Football League. Additional, proposition bets have been commonly offered by casinos for numerous variables in the sporting industry, including and especially with respect to the Superbowl® produced by the National Football League. These casinos do not focus on individual leagues as the basis for the bets, however. That is, these casinos do not contemplate wagers placed on individual leagues by fantasy team owners within the league or people outside of the league seeking to bet on events and outcomes in a league. Additionally, these casinos do not contemplate the system of integrating secondary wagers in fantasy sports with a pre-existing fantasy league.

Fantasy sports are in need of a way to increase consistent and long lasting interest by fantasy owners and/or fantasy participants. That is, fantasy sports need to provide fantasy owners with a higher level of enjoyment, increased participation, and a fuller, more interactive experience, for example, for owners who fall out of contention for their fantasy championship, but wish to remain active in fantasy sports nonetheless. Accordingly, there is an unmet need in the art for one or more secondary games playable by fantasy sports enthusiasts and others that provide competition in addition to simply determining the overall winner of each league.

More specifically, there is a need in the art for a secondary gaming system in fantasy sports that allows fantasy teams, and their fantasy owners, to compete against one another on one or more user selected variables (i.e., player statistics and fantasy team outcomes) to expand the level of competition between fantasy teams in a fantasy league, or provide an avenue of interest in a fantasy sports league for individuals not a part of the league. Thus, there is a need for an automated system and methods to provide secondary gaming on fantasy league. More specifically, there is a need in the art for a system or methods to propose, present, post, record, monitor, update, and otherwise define secondary games in a league, by integrating such information or supplementing such information to a computerized league manager.

SUMMARY OF THE INVENTION

The present invention meets the unmet needs in the art by providing a system and method for playing secondary competitions (otherwise known as "secondary games") in addition to or as an alternate to playing conventional fantasy sports, which are focused on competing for the best overall statistics or overall records.

In any fantasy league, the goal of each team is to win the league. Thus, the primary game from the perspective of a team in the league is to be declared the champion of the league. More broadly, the primary game is to have one's fantasy team finish better than other fantasy teams in the league. Conventionally, this is determined by overall record, playoff performance, collection of points, or leading one or more categories. The present invention introduces additional fantasy games, particularly when a team in a league is unable to win the league or has reduced chances of winning the league. The present invention provides members of a fantasy league and non-members of the fantasy league with the ability to engage in the fantasy sport. Members and non-members can engage in games related to specific players, games, and events.

As a member of the league, the present invention allows members to compete with other members in the league on any statistic. The present invention does not encompass a game in which a league is formed to determine the overall winner of the league. This, after all, t is the primary game associated with the league. A first team in a league can however introduce a game in which the first team challenges another team that it will win the league. Here, the number of teams the first team can challenge must be a subset of the overall league (i.e., the challenge cannot be issued to every team in the league). Additionally, the present invention includes games in which the first team can predict that second team will win the league, or that the second team will finish second, third, or even last for example. The first team can also enter a game to predict that the second team will score a certain number of points or have over or under a predicted number of points. The first team may also enter a game to predict rankings and finishes of teams or one or more players, overall in the league or relative to another team or player.

One aspect of the present invention includes fantasy game between at least, but preferably, two parties, premised on the statistical performance of one player in separate periods of time, wherein the game has a consideration offered by both parties and wherein the winning party takes the losing party's consideration. In other preferred embodiments, the players selected by each party may be different and/or the duration of time may be the same.

In other embodiments, a computer implemented system having a processor and ability to send and receive signals and date (referred to herein as the "system") providing users, preferably within the same fantasy league, an ability to engage in secondary fantasy games, wherein a first party may propose the game and a second party may accept the game. In some embodiments, the game is submitted to the system upon acceptance. In yet additional embodiments, the consideration in the game is processed upon completion of the game, preferably upon completion of the real-life sport on which player statistical performance in the secondary game is dependent.

In certain embodiments, in which a secondary game may be proposed and accepted in real-time, or substantially real-time, through a electronic communication link between at least two parties, wherein parameters of the game are agreed upon and valuable consideration is electronically accounted for and distributed at the conclusion of the game.

Any of the embodiments illustrated above and below stand independently or features may be combined to achieve preferred embodiments. Additional advantages and embodiments of the invention will also become more apparent to those of ordinary skill in the art upon review of the teachings of the present application.

BRIEF DESCRIPTION OF DRAWINGS

Further advantageous features of the present invention will become more apparent with the following detailed description when taken with reference to the accompanying drawings in which:

Figure 1:
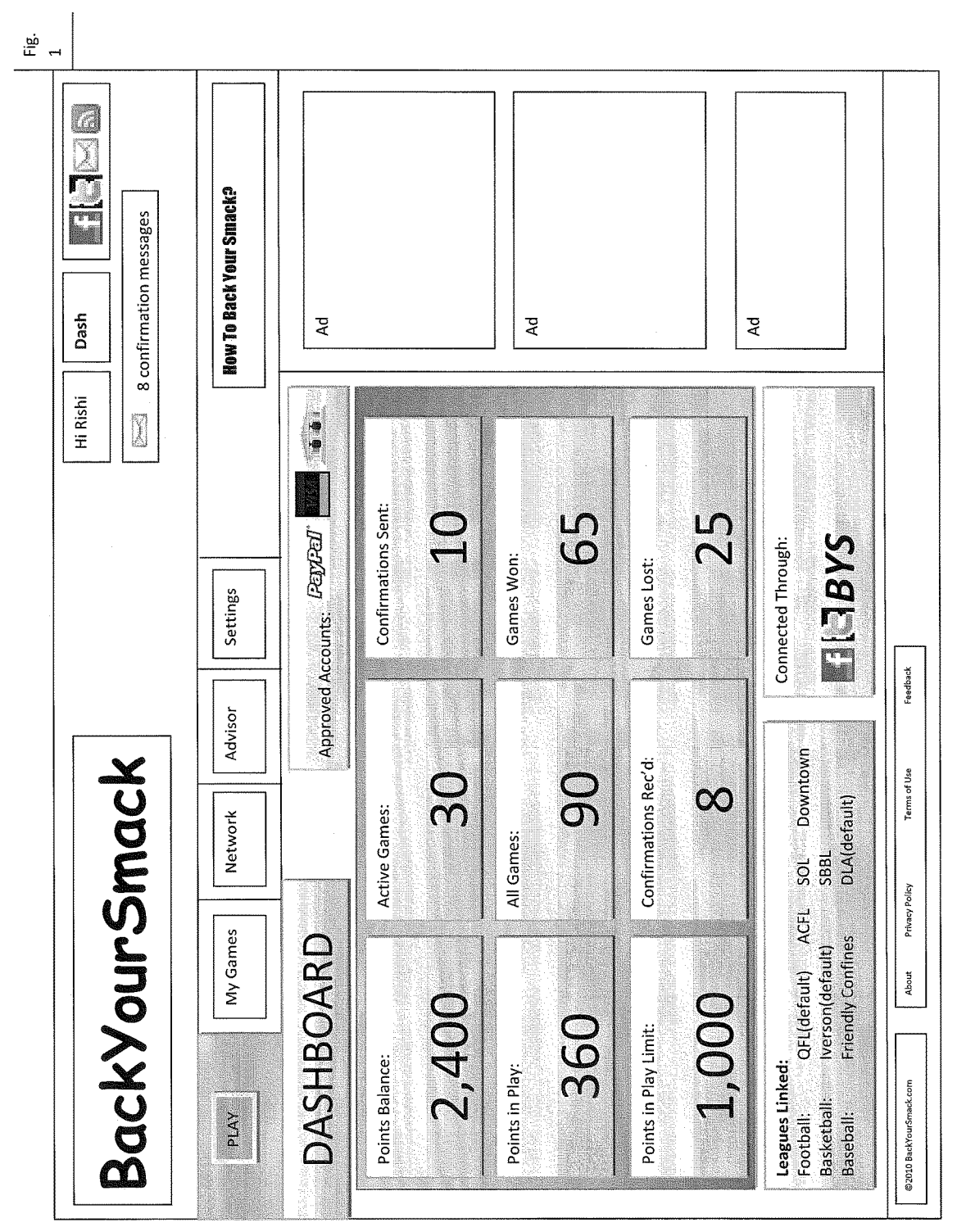

FIG. 1 illustrates a representation from an exemplary graphical user interface of system providing secondary games, in which display provides a user with a summary of relevant data regarding his/her secondary game play, in accordance with one or more embodiments of the present invention;

Figure 12:
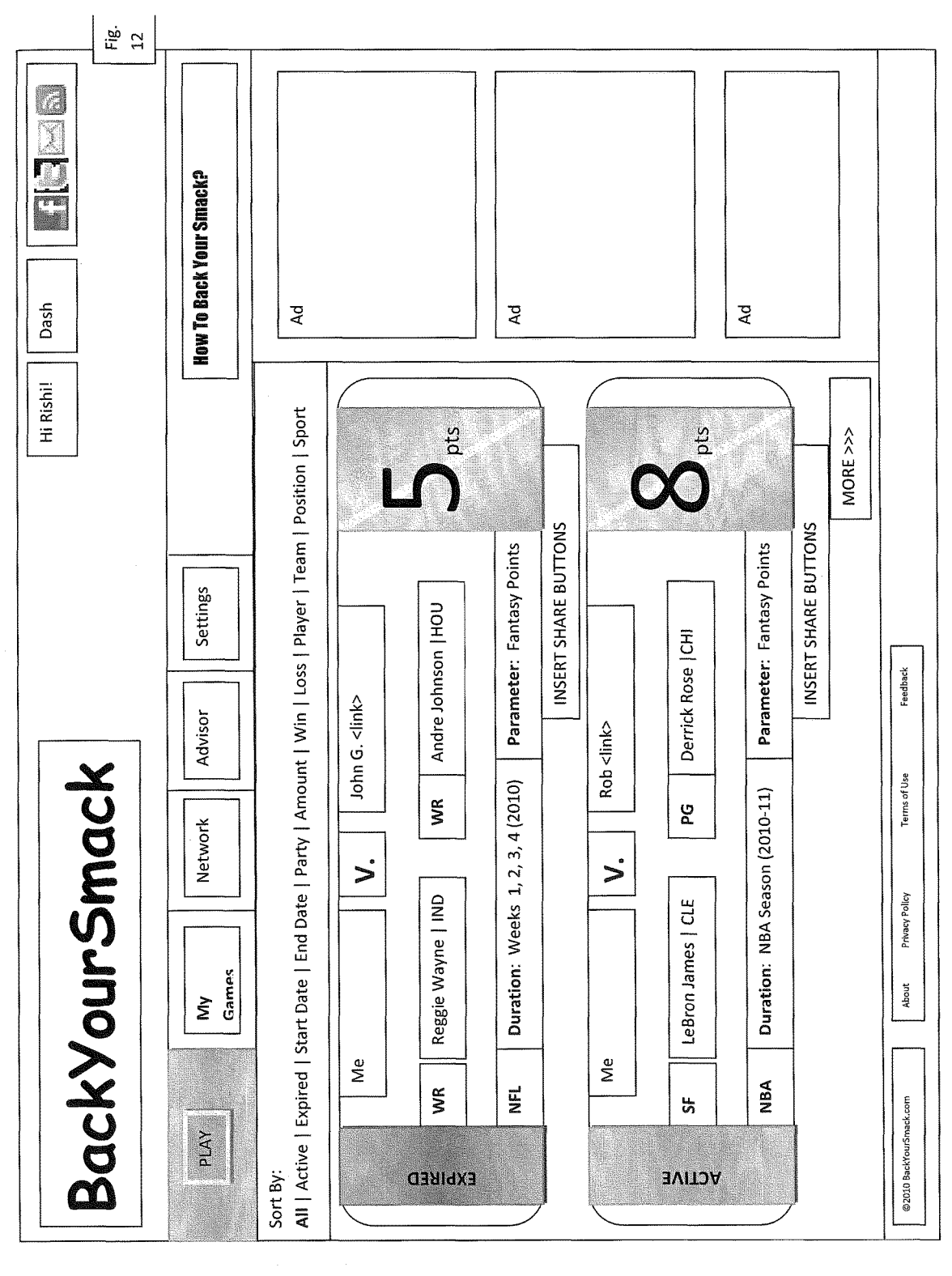

FIGS. 8-12 illustrate representations from an exemplary graphical user interface of system providing secondary games, in which various secondary game match ups are displayed, in accordance with one or more embodiments of the present invention;

Figure 13:
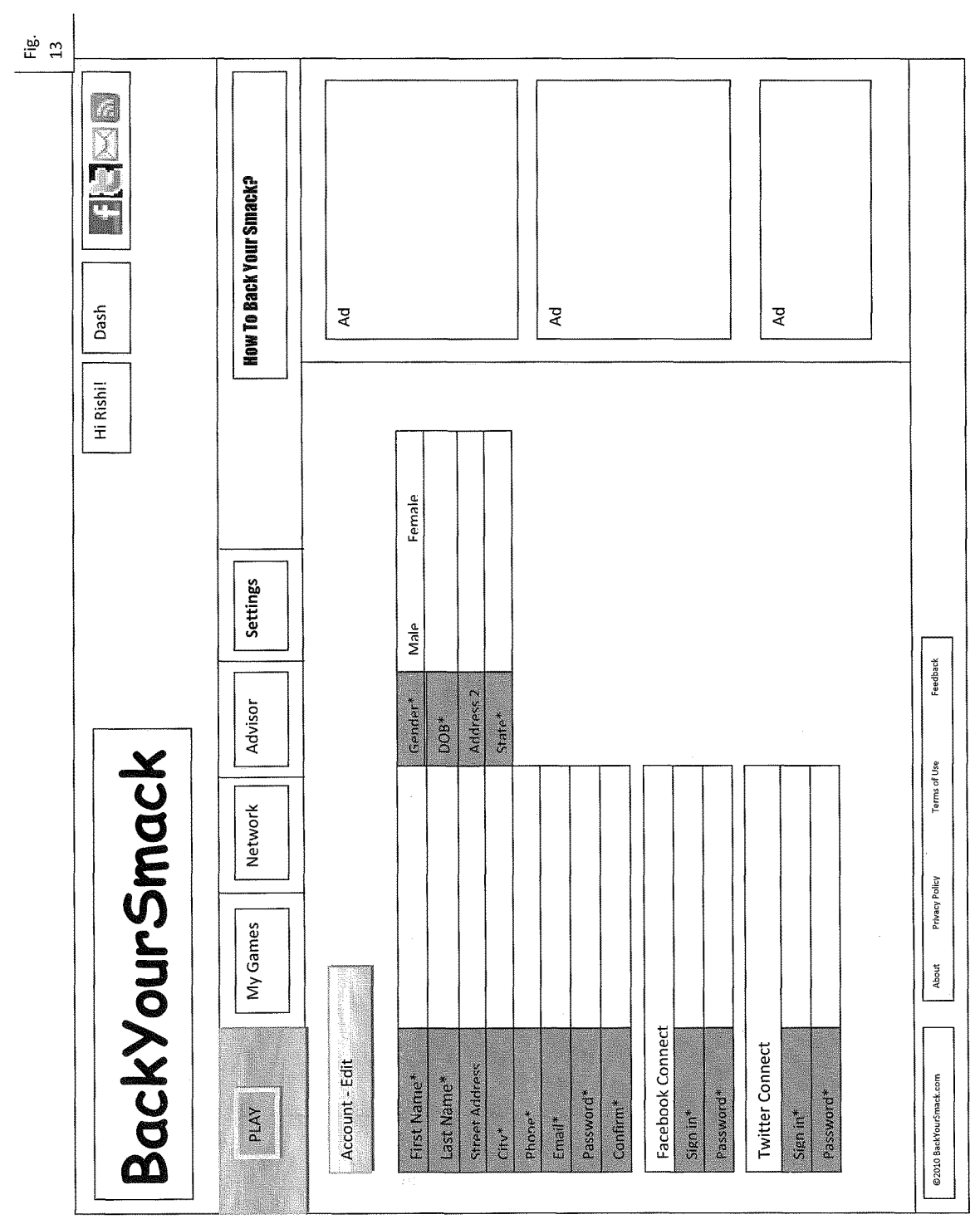
Figure 14:
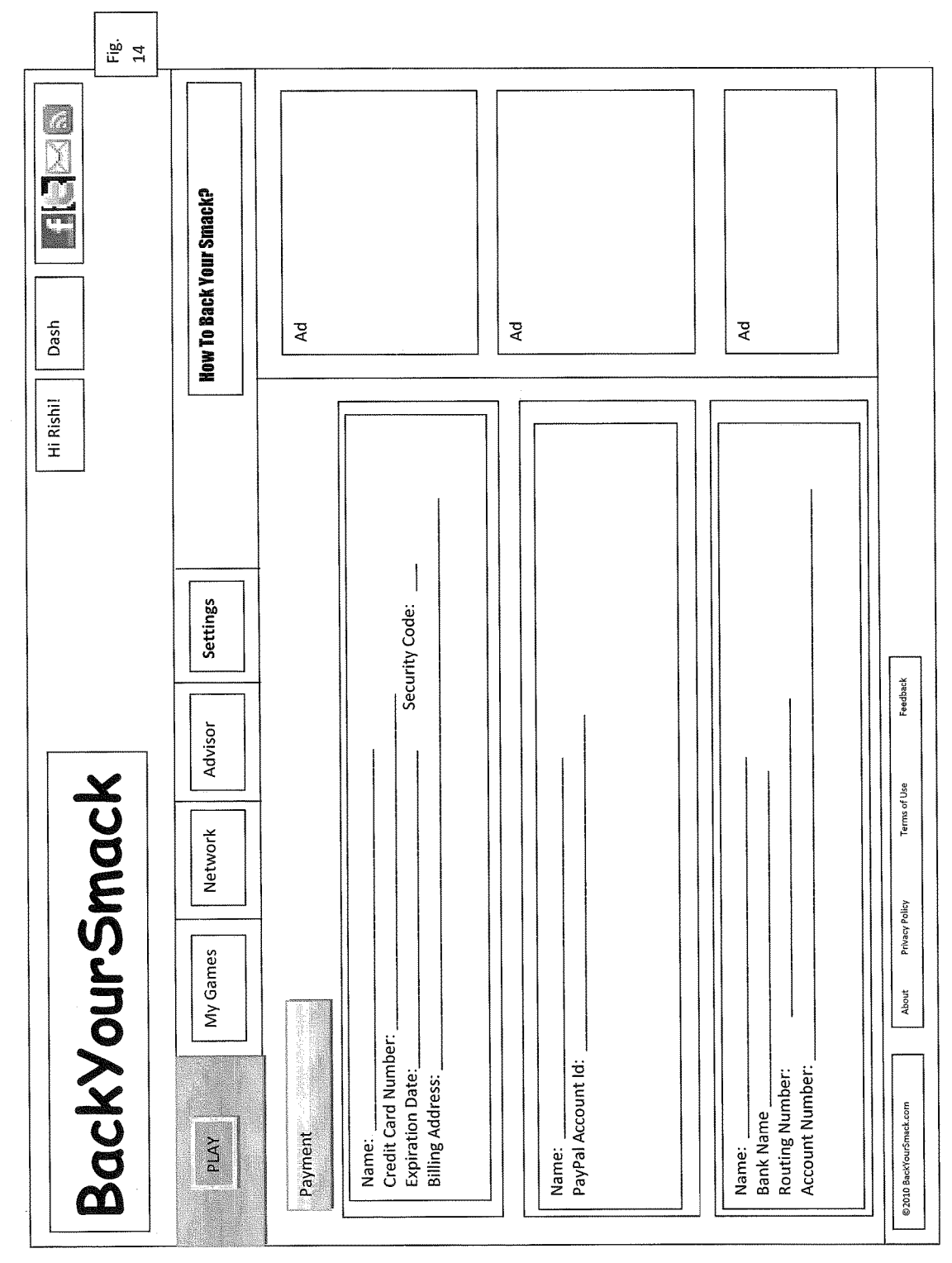

FIGS. 13 and 14 illustrate representations from an exemplary graphical user interface of system providing secondary games, in which user information forms are displayed, in accordance with one or more embodiments of the present invention;

Figure 20:
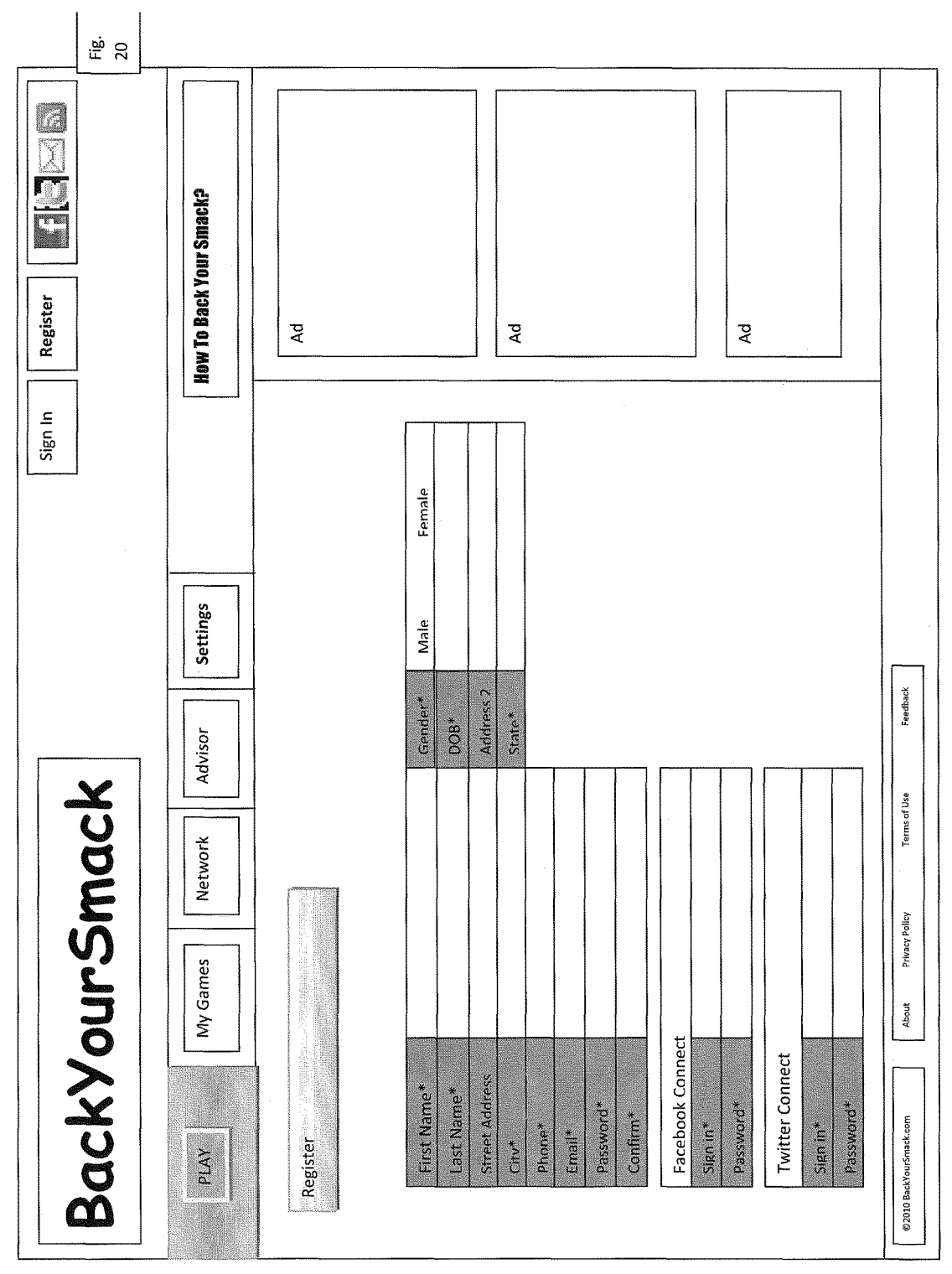

FIGS. 20 and 21 illustrate representations from an exemplary graphical user interface of system providing secondary games, in which the user registration and sign in modules are displayed, in accordance with one or more embodiments of the present invention;

Figure 23:
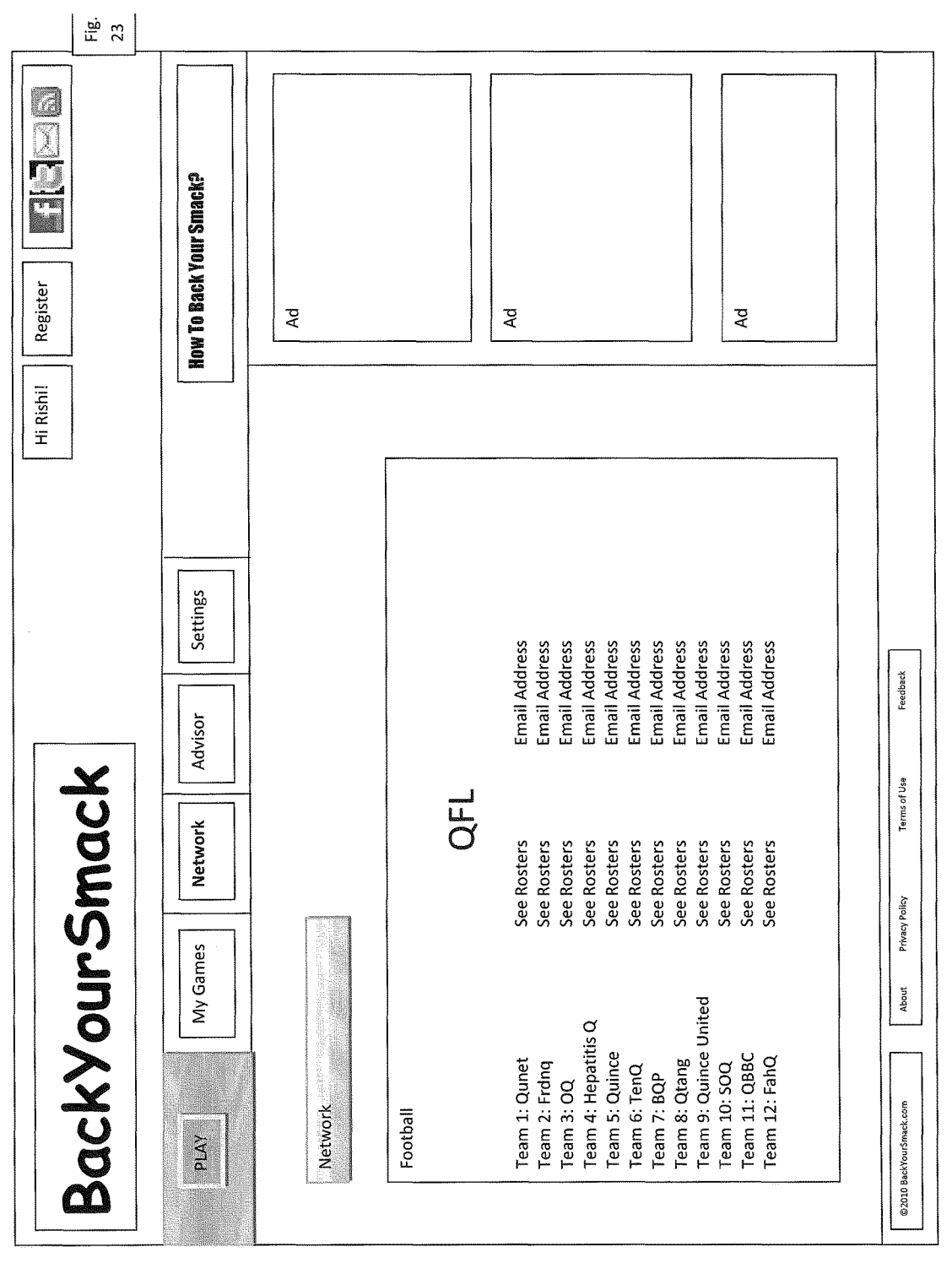

FIG. 23 illustrates a representation from an exemplary graphical user interface of system providing secondary games, in which a user's contacts in a fantasy league are displayed, in accordance with one or more embodiments of the present invention;

DETAILED DESCRIPTION OF THE PREFERRED EMBODIMENTS

Figure 2:
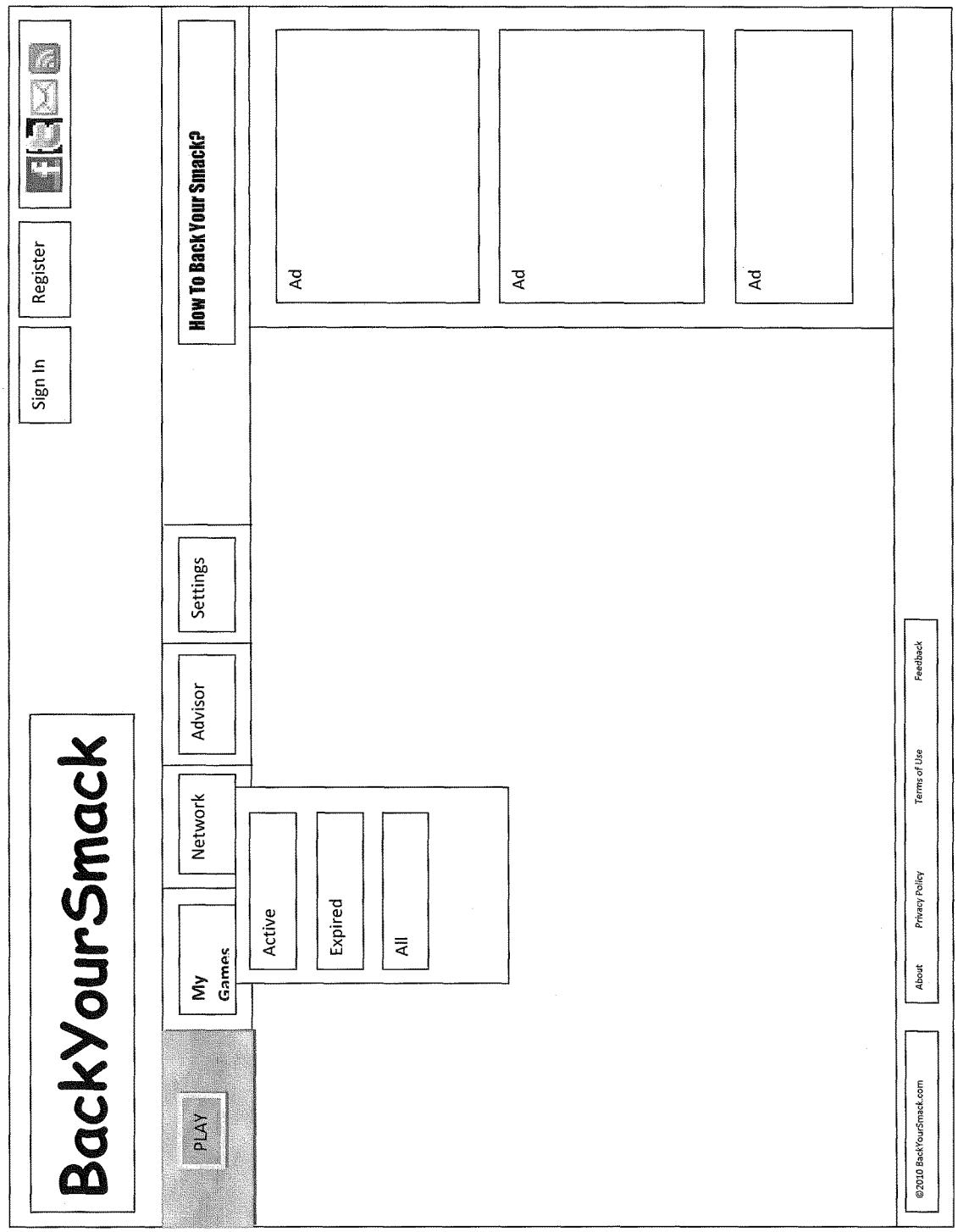
FIG. 2 illustrates a representation from an exemplary graphical user interface of system providing secondary games, in which the GUI provides menu listings to display a user's games, in accordance with one or more embodiments of the present invention.
Figure 3:
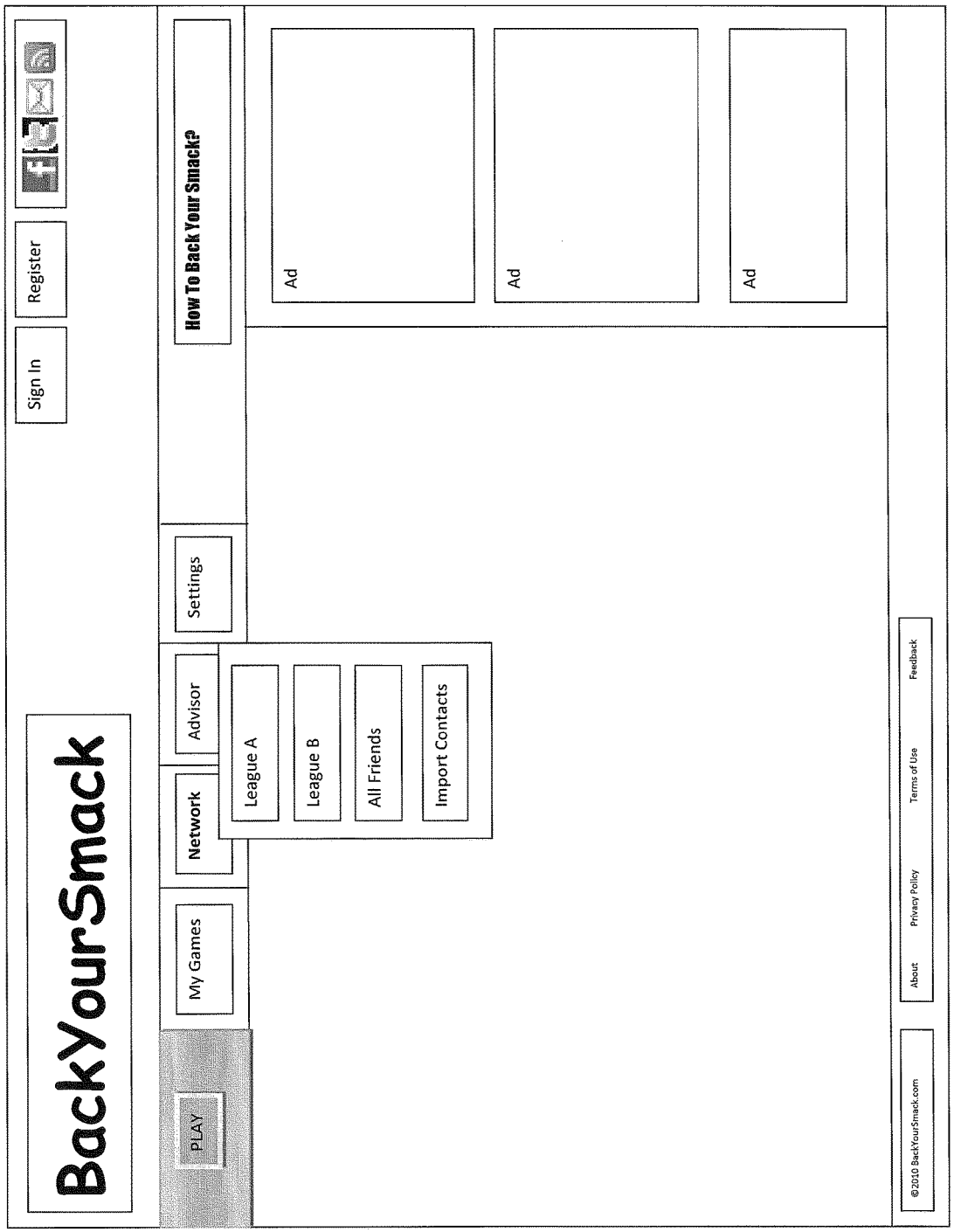
FIG. 3 illustrates a representation from an exemplary graphical user interface of system providing secondary games, in which the GUI displays a user's networks of fantasy leagues and other potential parties to the secondary games, in accordance with one or more embodiments of the present invention.
Figure 4:
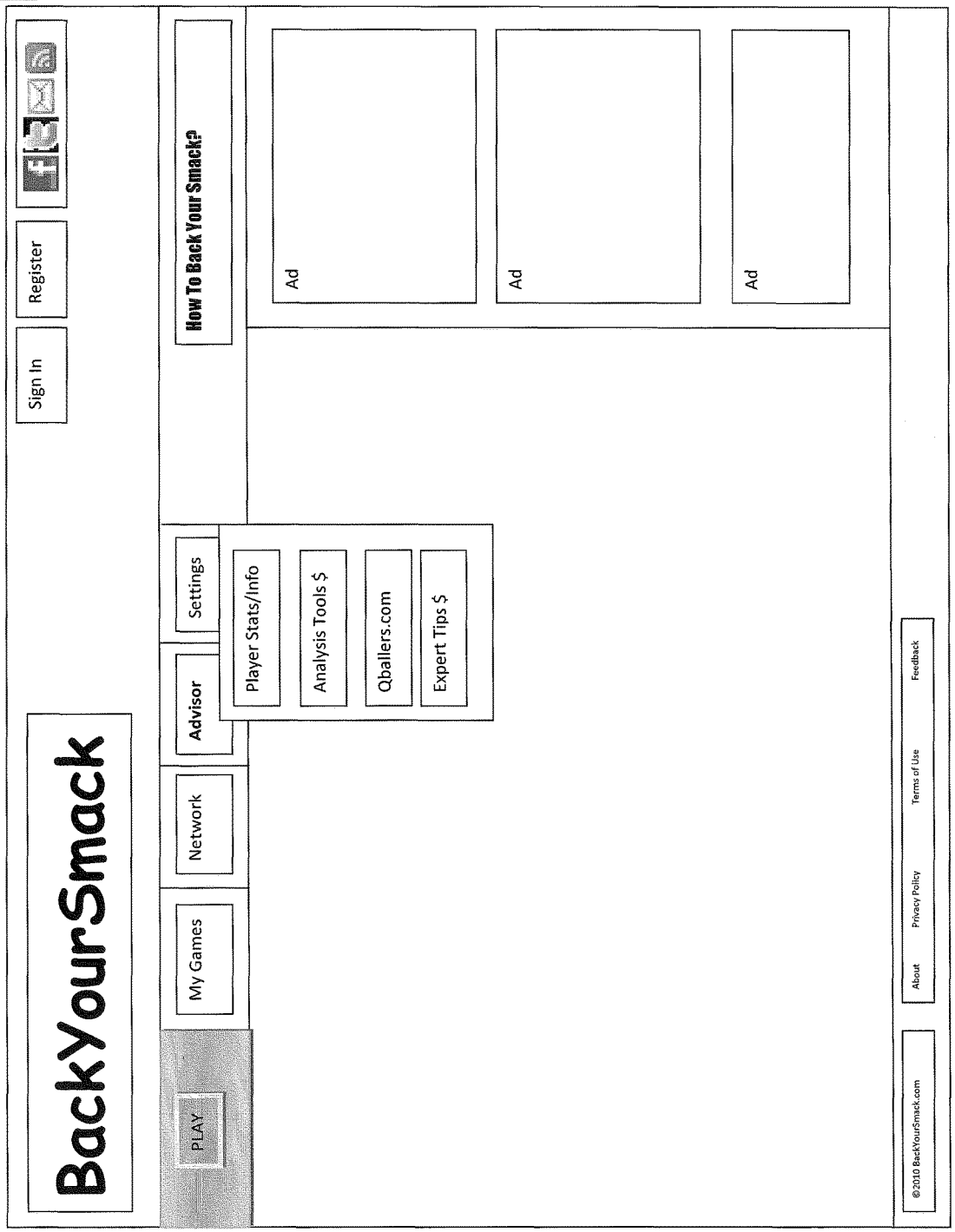
FIG. 4 illustrates a representation from an exemplary graphical user interface of system providing secondary games, in which news and data feed options are displayed, in accordance with one or more embodiments of the present invention.
Figure 5:
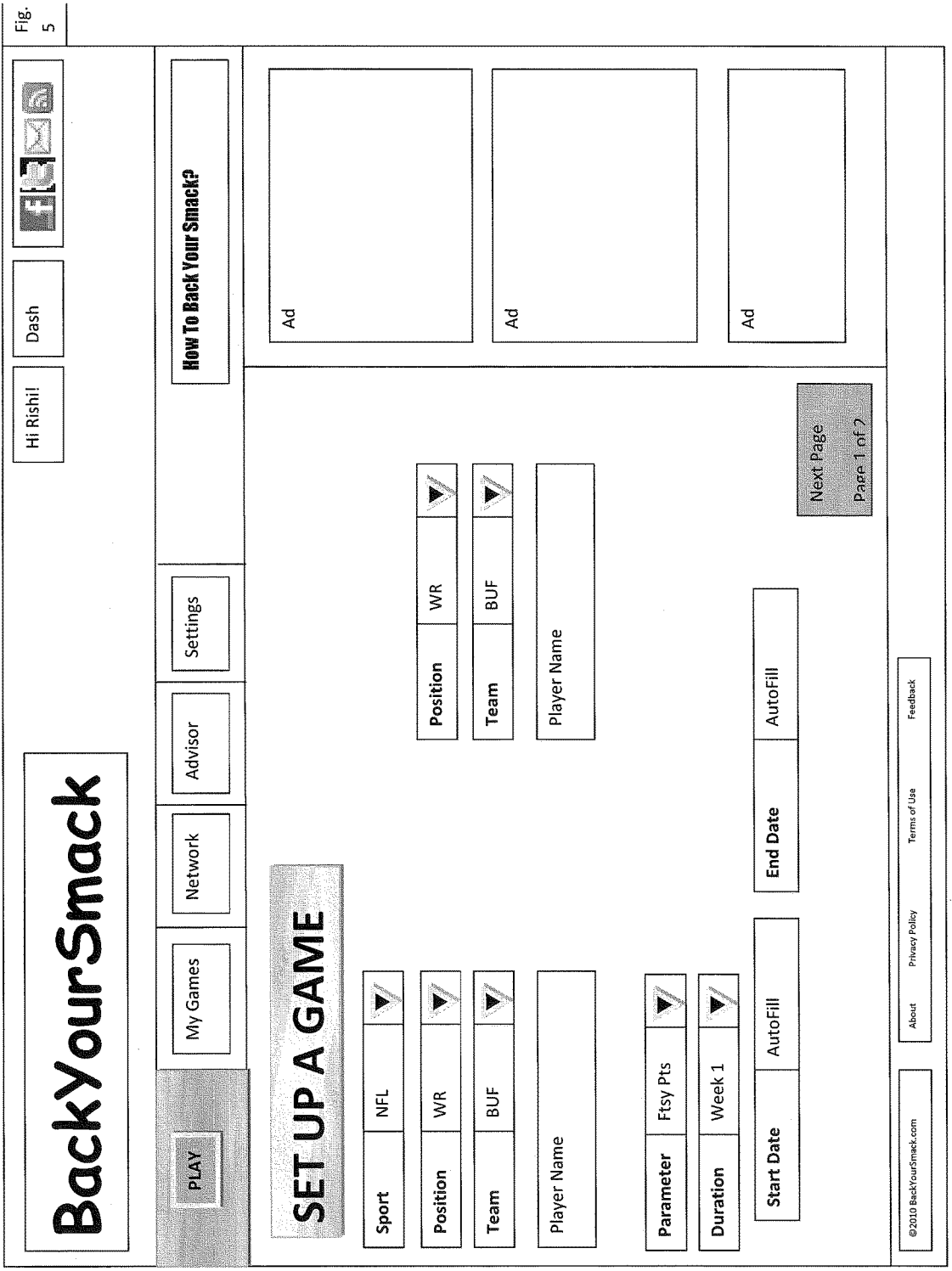
FIG. 5 illustrates a representation from an exemplary graphical user interface of system providing secondary games, in which a game proposal form is displayed, in accordance with one or more embodiments of the present invention.
Figure 6:
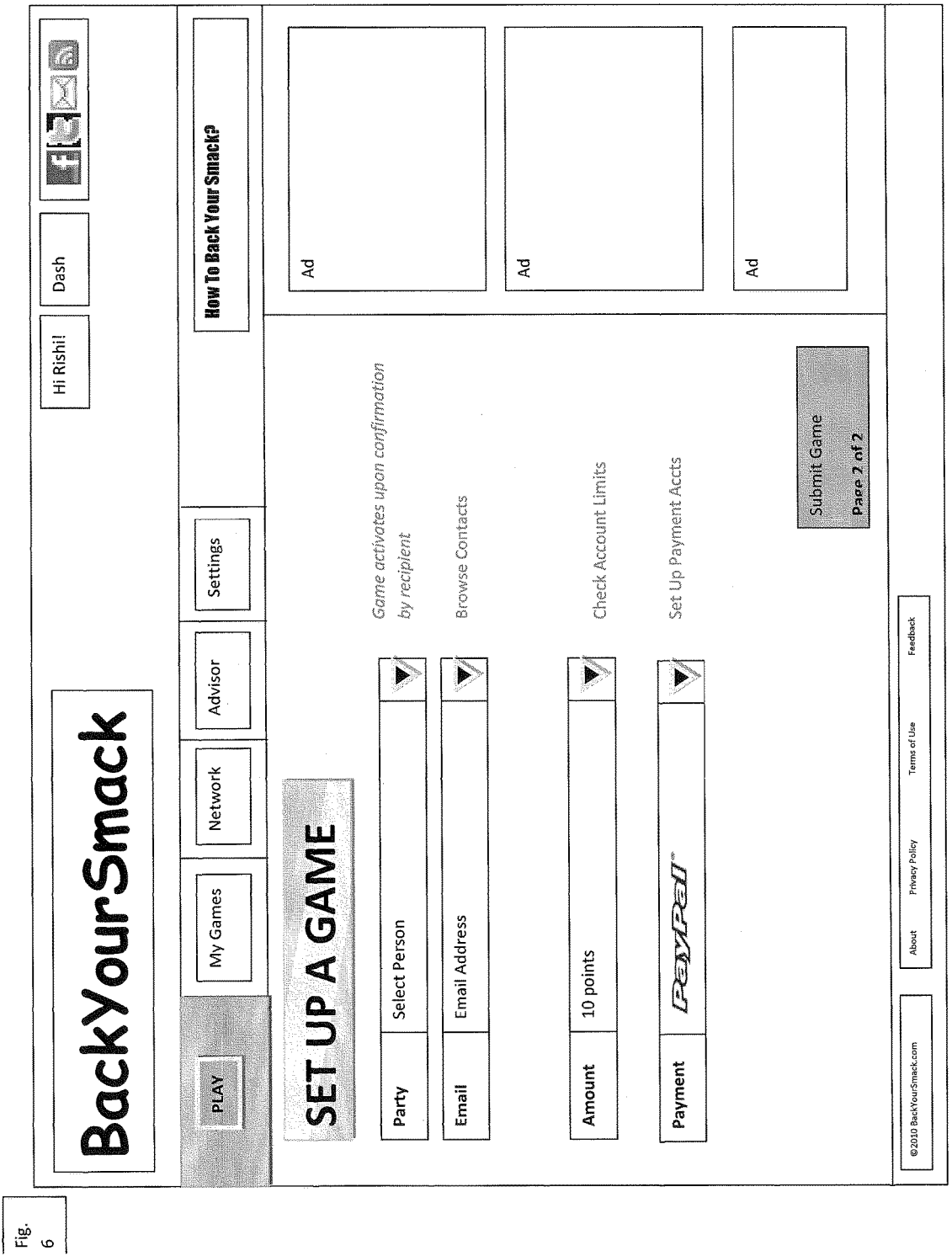
FIG. 6 illustrates a representation from an exemplary graphical user interface of system providing secondary games, in which a game proposal form relating to values and payment is displayed, in accordance with one or more embodiments of the present invention.
Figure 7:
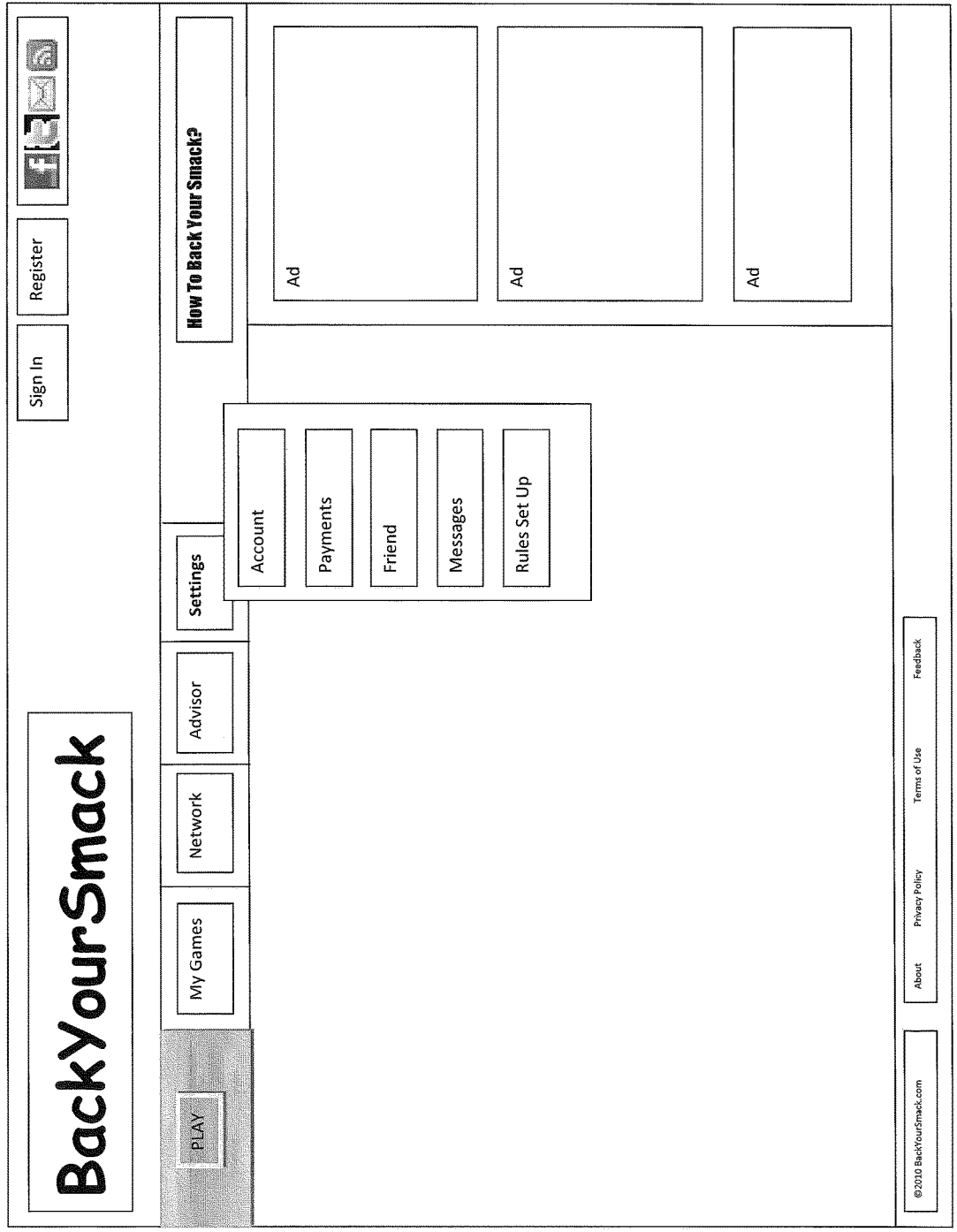
FIG. 7 illustrates a representation from an exemplary graphical user interface of system providing secondary games, in which a menu of user customizations is displayed, in accordance with one or more embodiments of the present invention.
Figure 8:
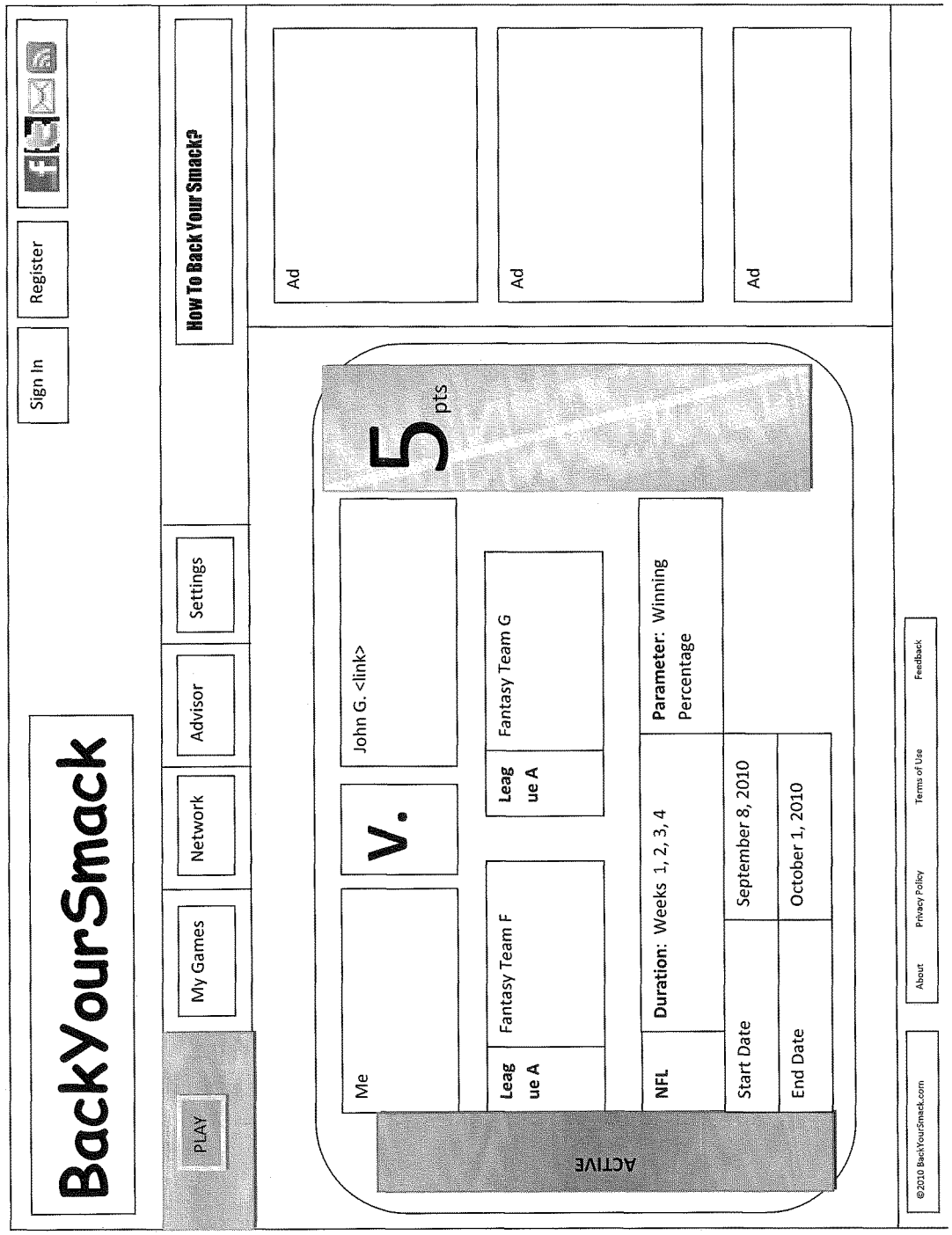
Figure 9:
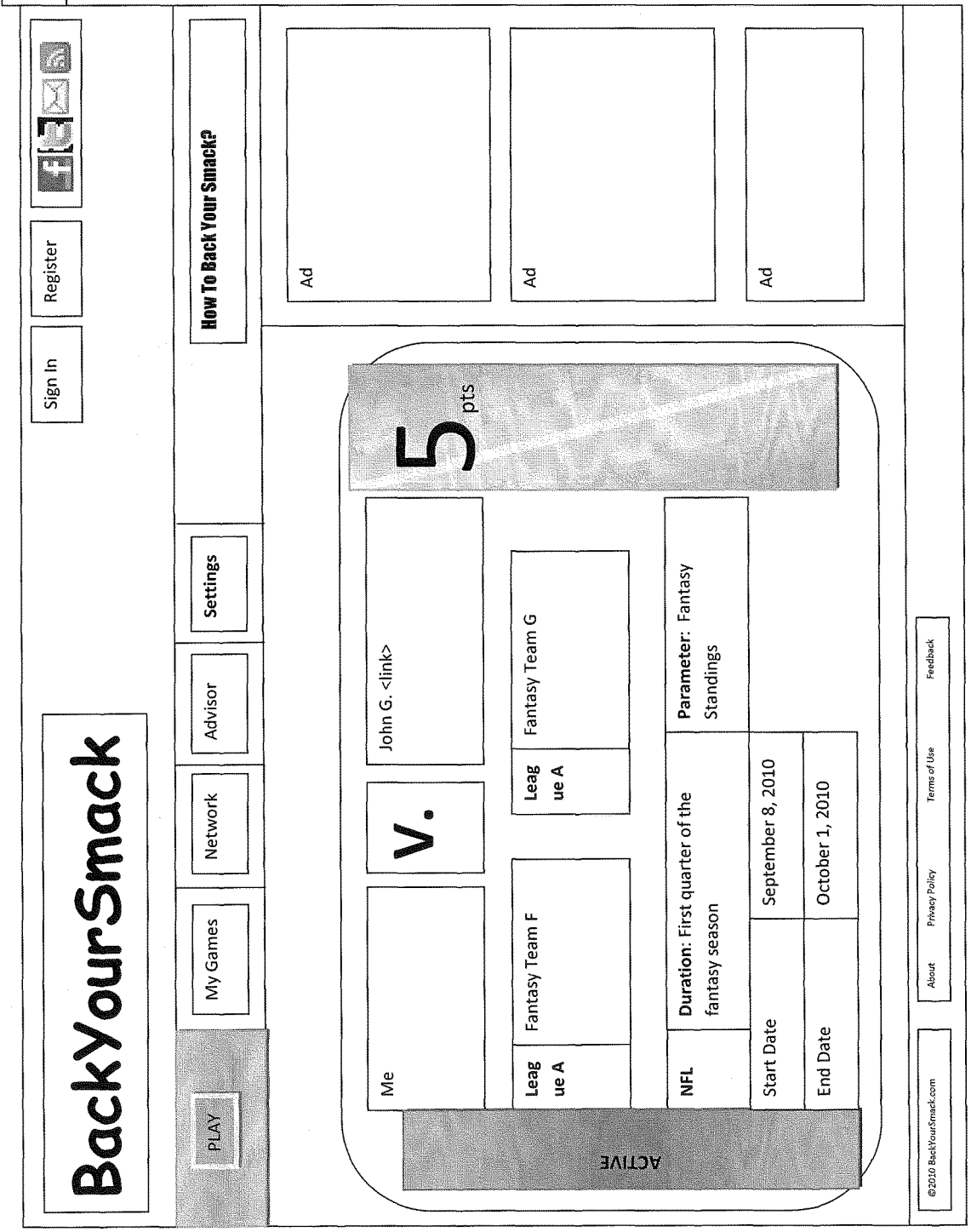
Figure 11:
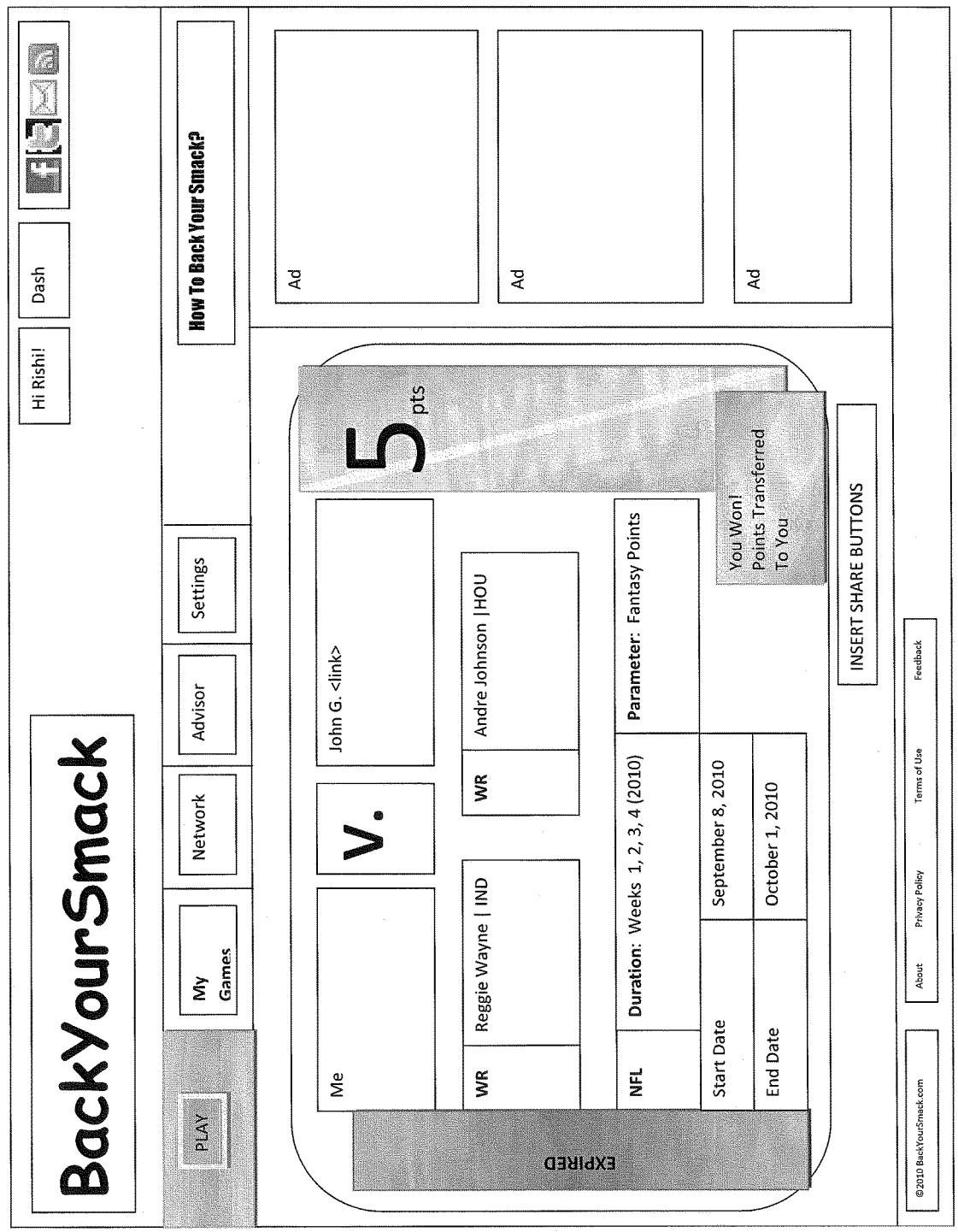
Figure 15:
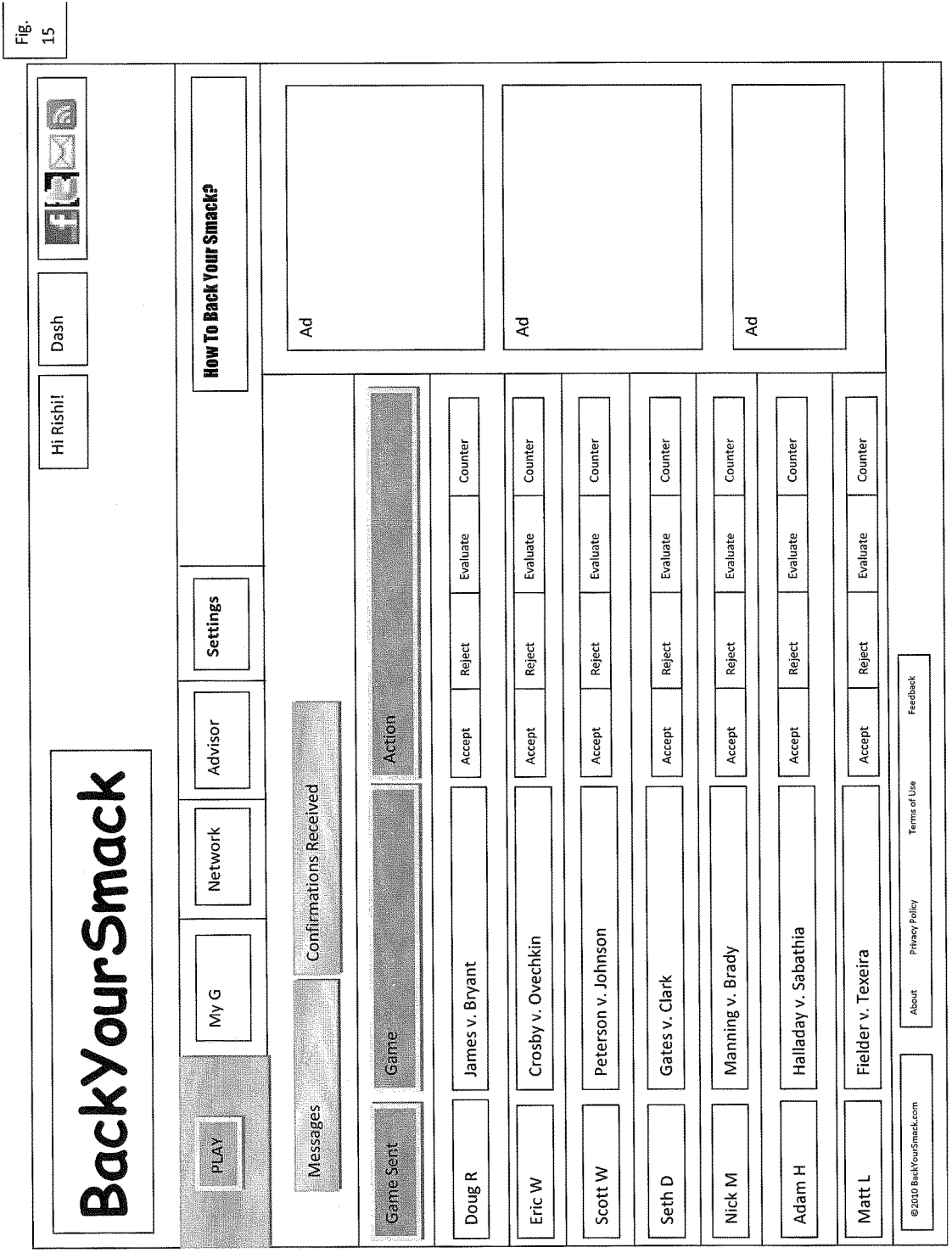
FIG. 15 illustrates a representation from an exemplary graphical user interface of system providing secondary games, in which the graphical user interface provides a listing of proposed games proposed to a receiving party, in accordance with one or more embodiments of the present invention.
Figure 16:
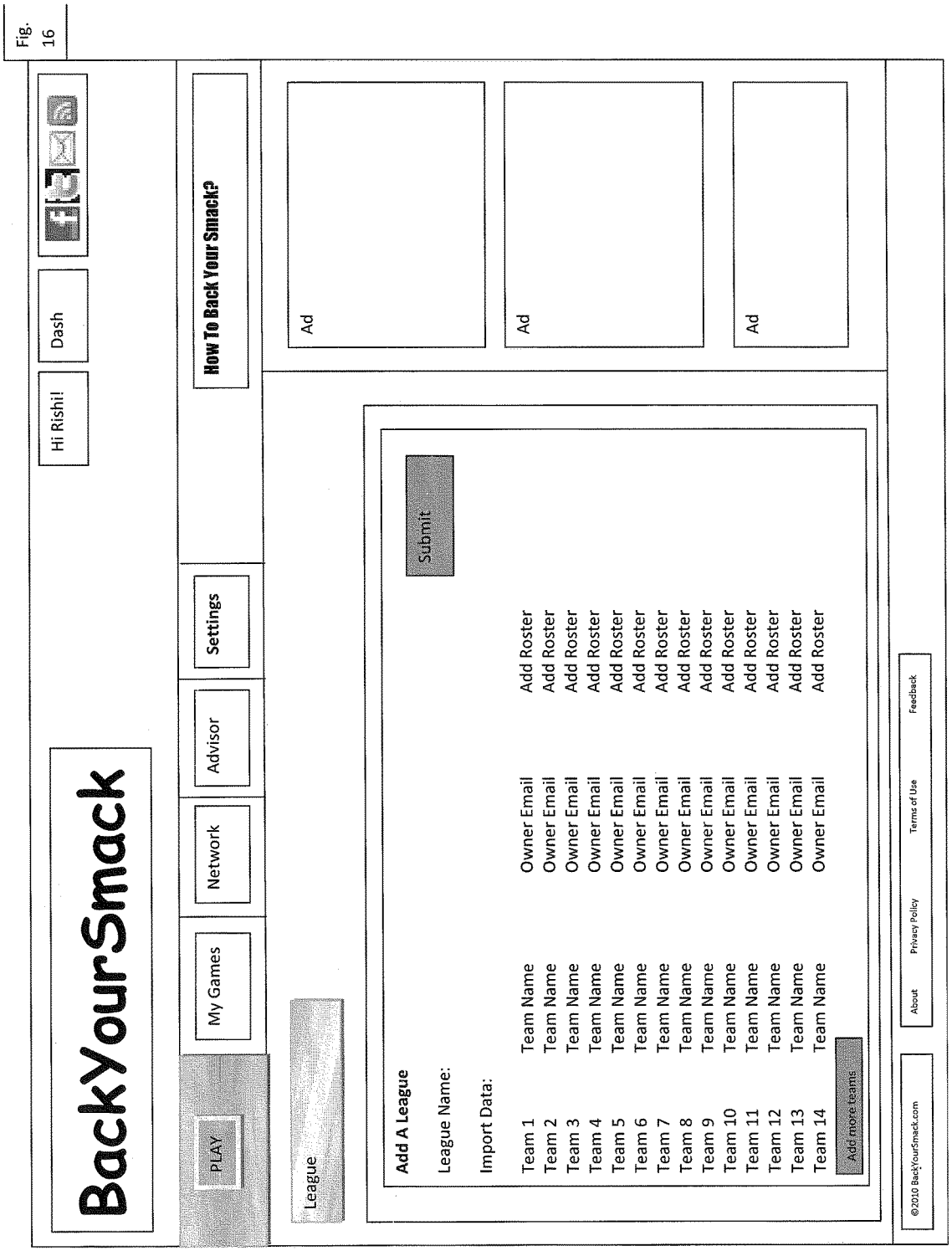
FIG. 16 illustrates a representation from an exemplary graphical user interface of system providing secondary games, in which a user associates with a fantasy league, in accordance with one or more embodiments of the present invention.
Figure 17:
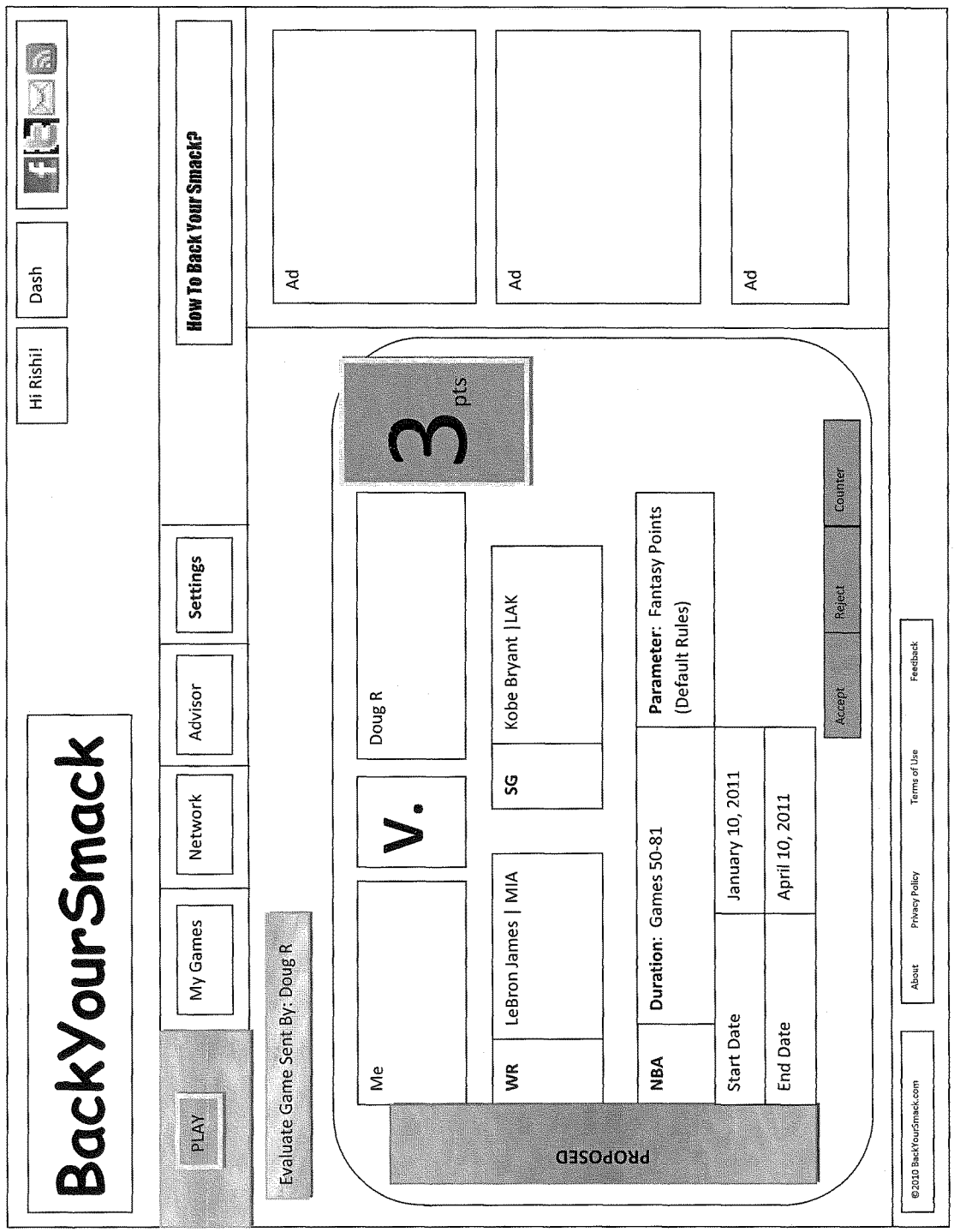
FIG. 17 illustrates a representation from an exemplary graphical user interface of system providing secondary games, in which the proposal received by the receiving party is displayed, in accordance with one or more embodiments of the present invention.
Figure 18:
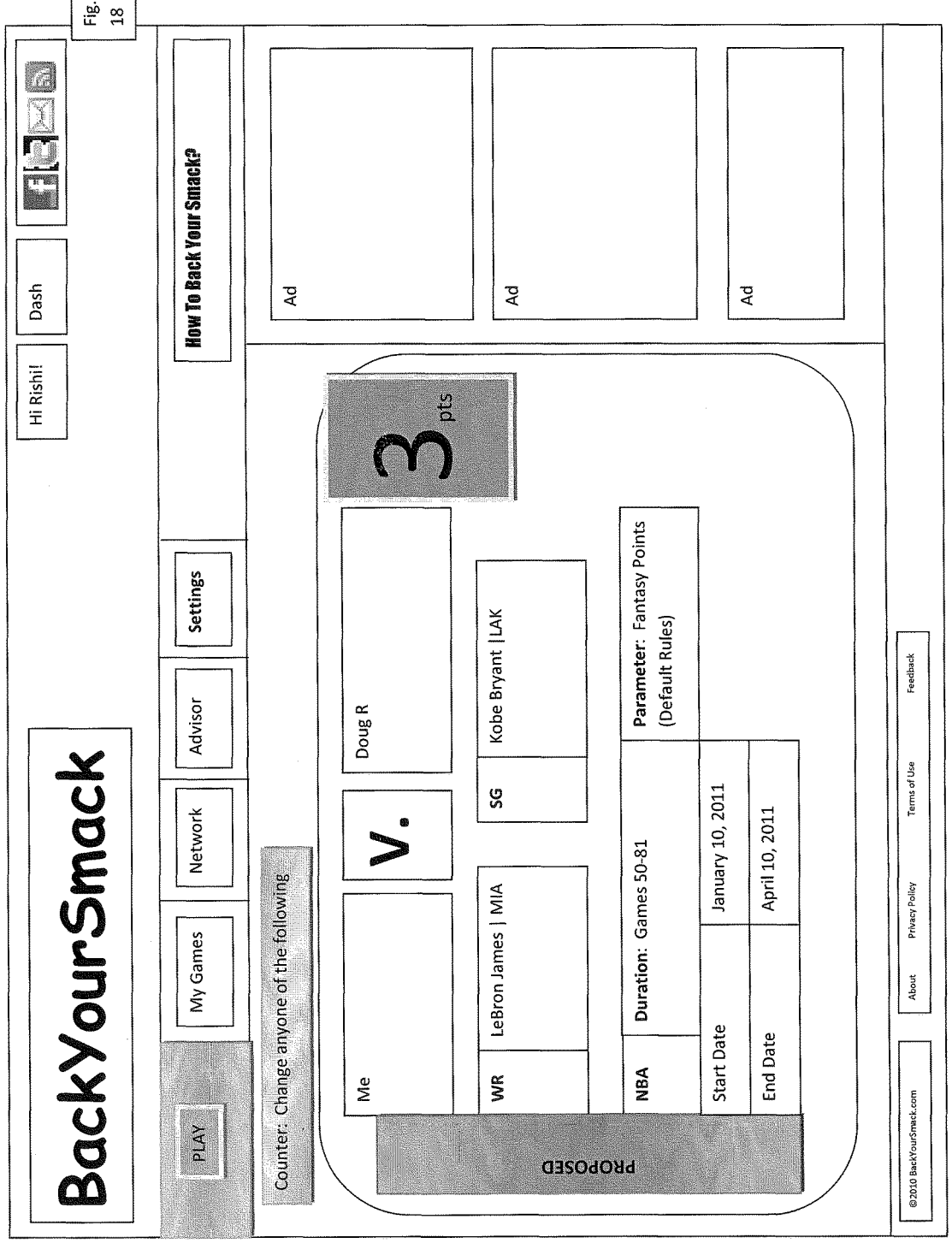
FIG. 18 illustrates a representation from an exemplary graphical user interface of system providing secondary games, in which the receiving party counters the proposal, in accordance with one or more embodiments of the present invention.
Figure 19:
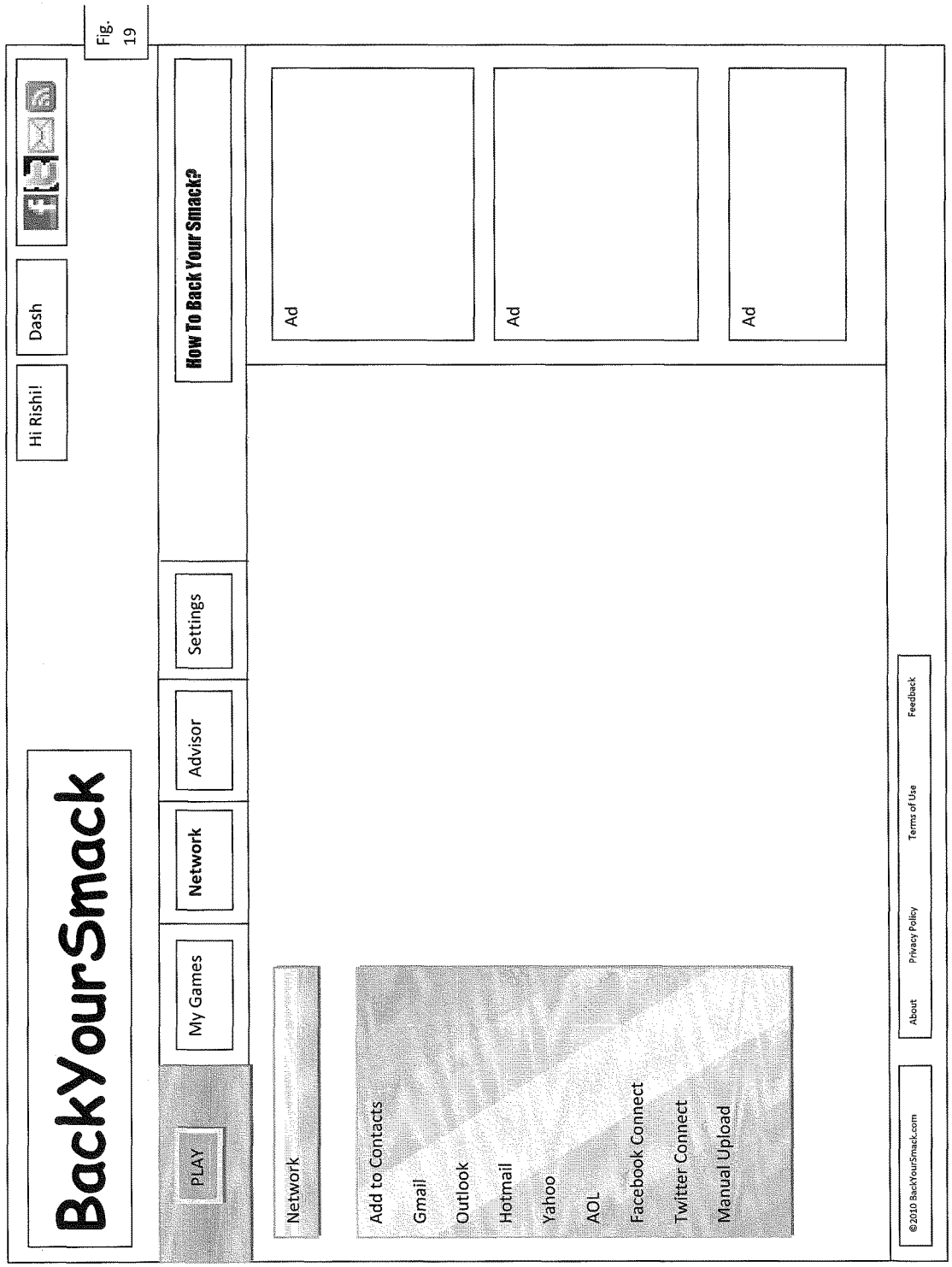
FIG. 19 illustrates a representation from an exemplary graphical user interface of system providing secondary games, in which the communication module is displayed, in accordance with one or more embodiments of the present invention.
Figure 21:
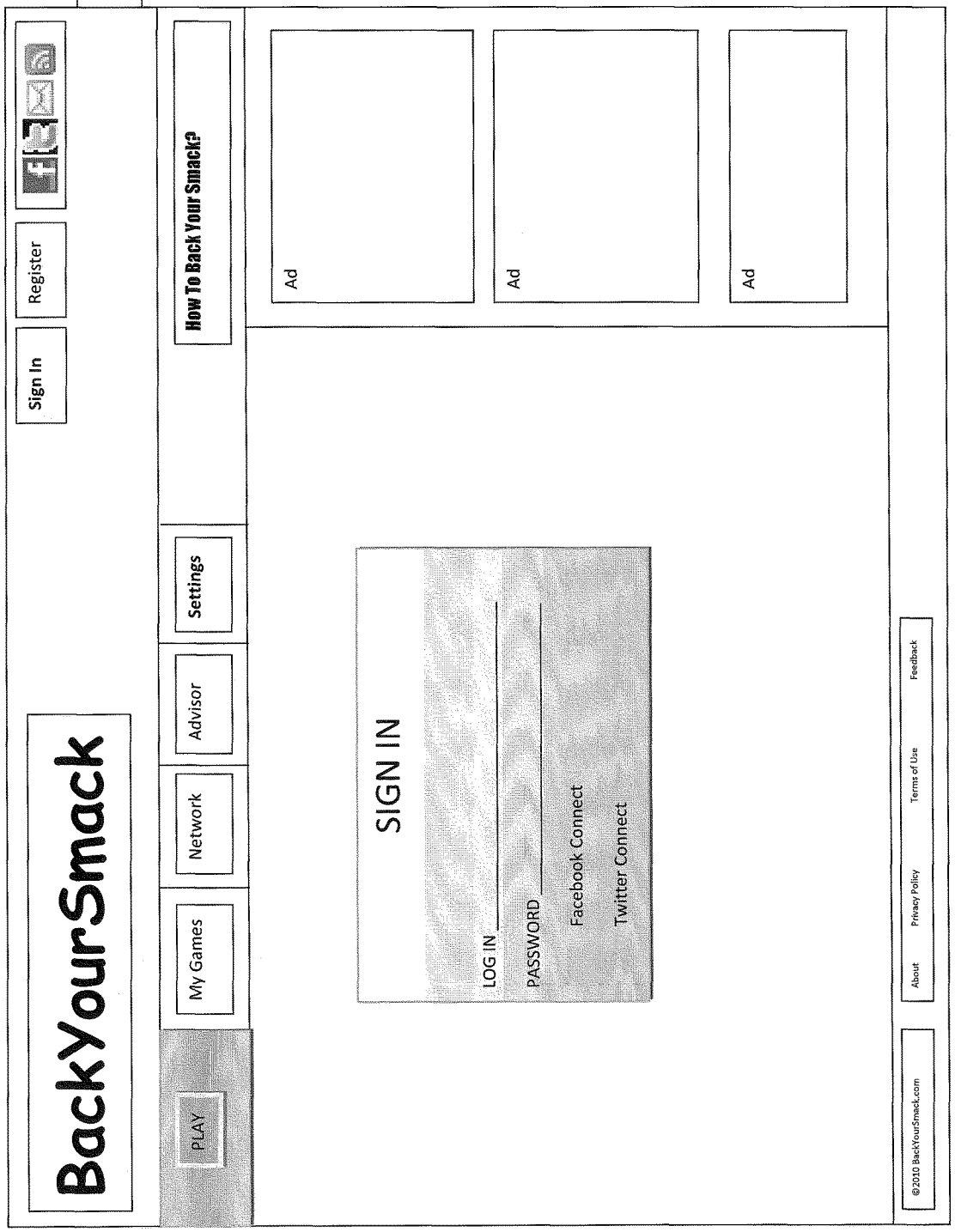
Figure 22:
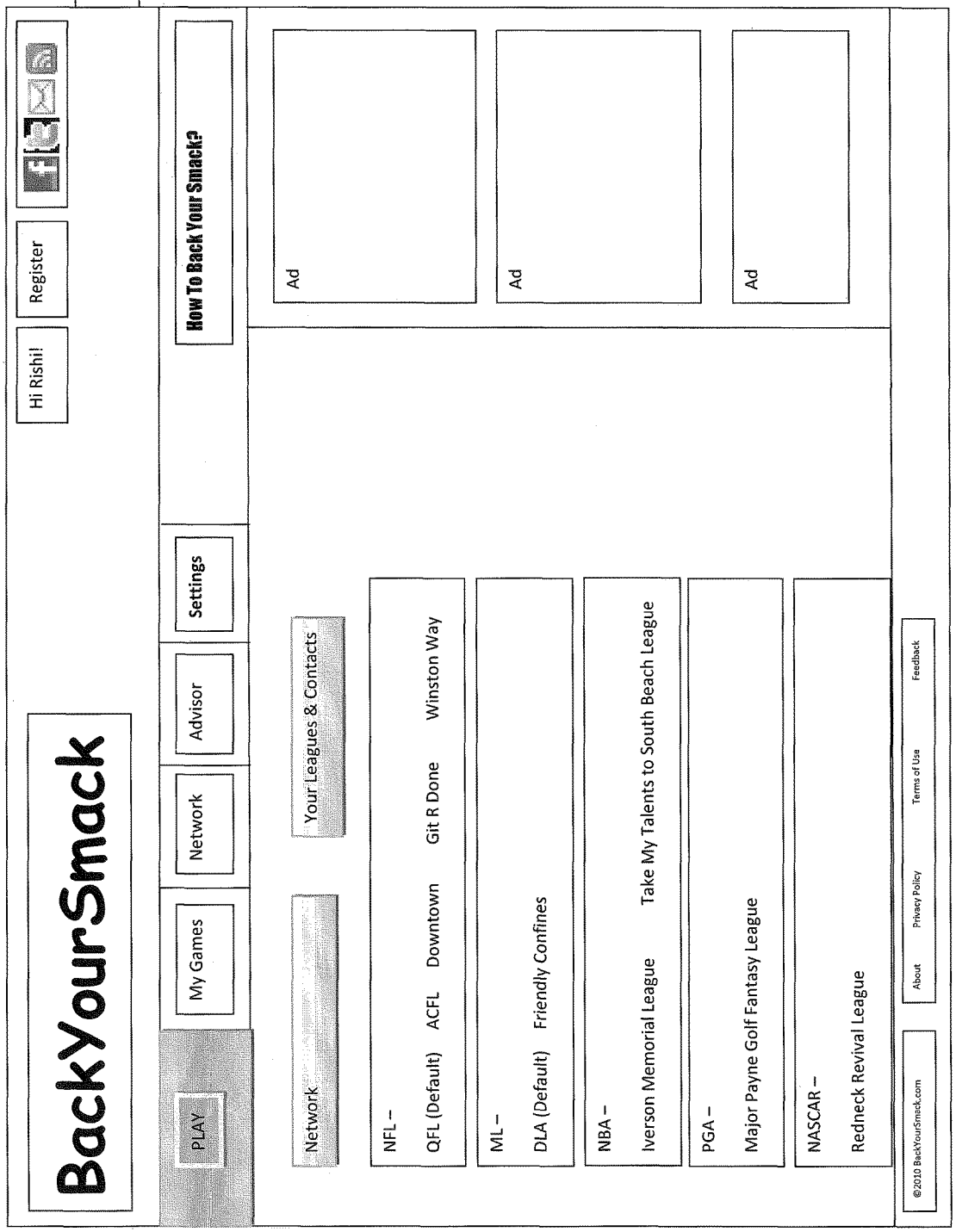
FIG. 22 illustrates a representation from an exemplary graphical user interface of system providing secondary games, in which a user's fantasy leagues are displayed, in accordance with one or more embodiments of the present invention.
Figure 24:
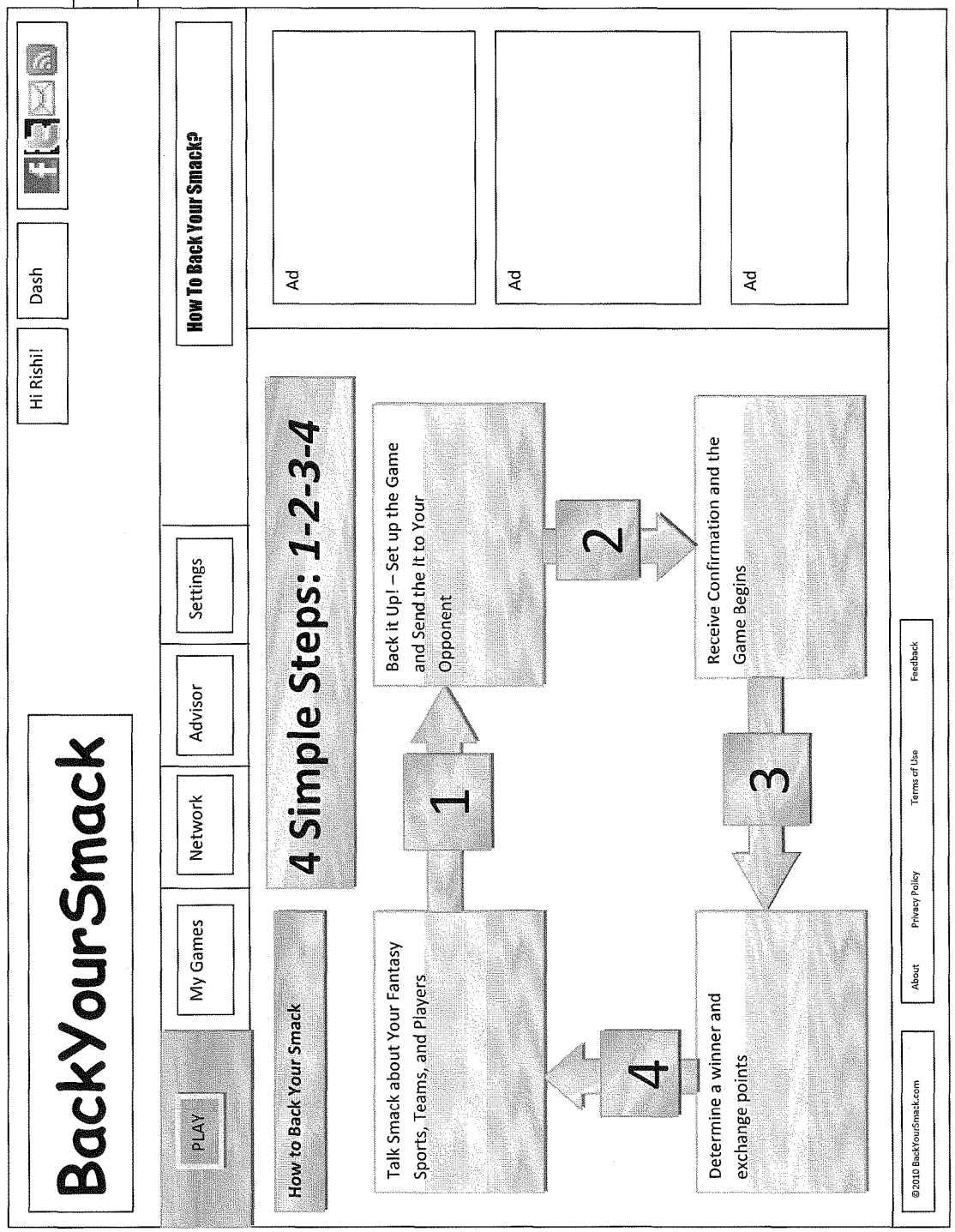
FIG. 24 illustrates a representation from an exemplary graphical user interface of system providing secondary games, in which a summary how-to graphic is displayed, in accordance with one or more embodiments of the present invention.
Figure 25:
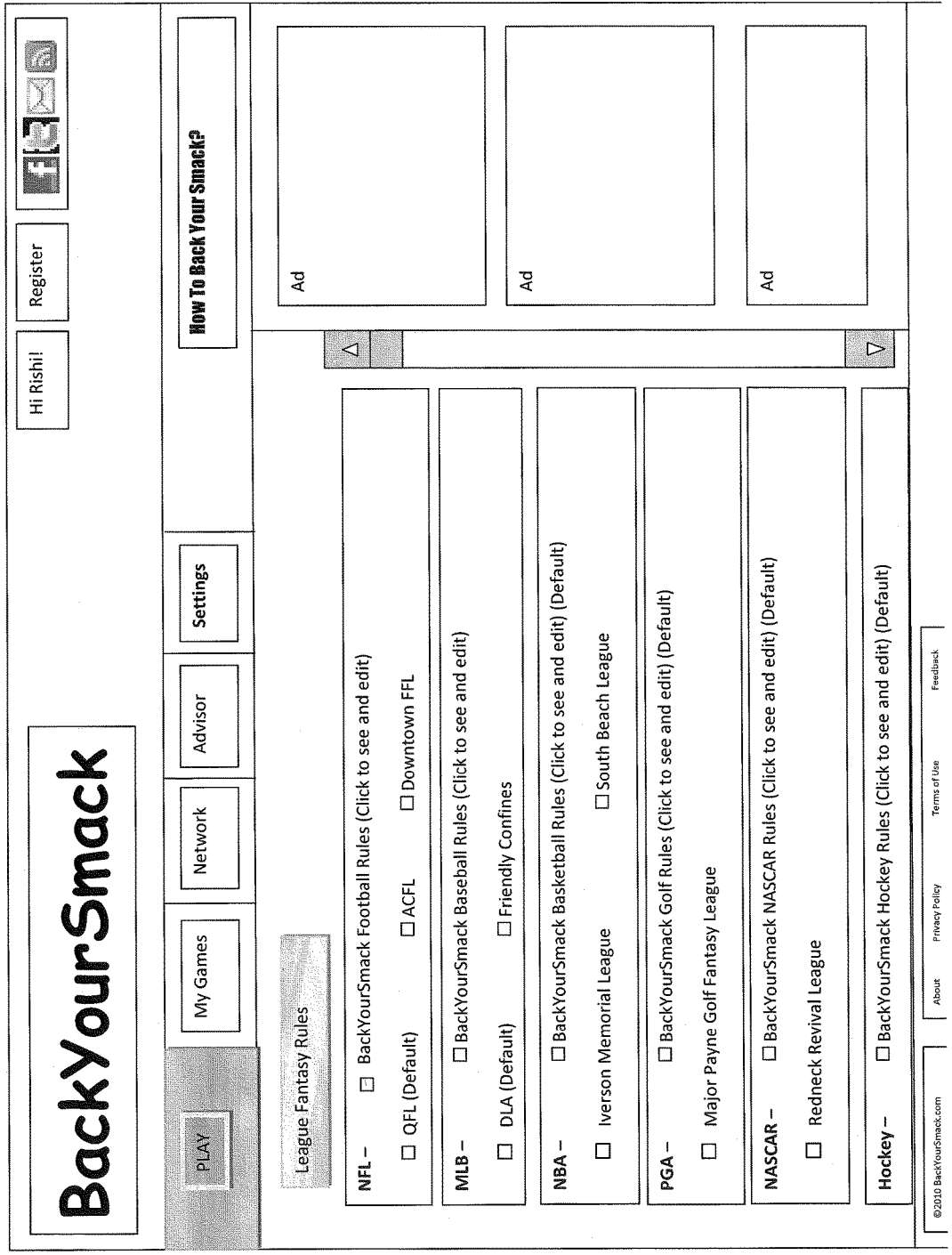
FIG. 25 illustrates a representation from an exemplary graphical user interface of system providing secondary games, in which a user can select the fantasy league rules to associate with the statistic measuring player performance, in accordance with one or more embodiments of the present invention.
Figure 26:
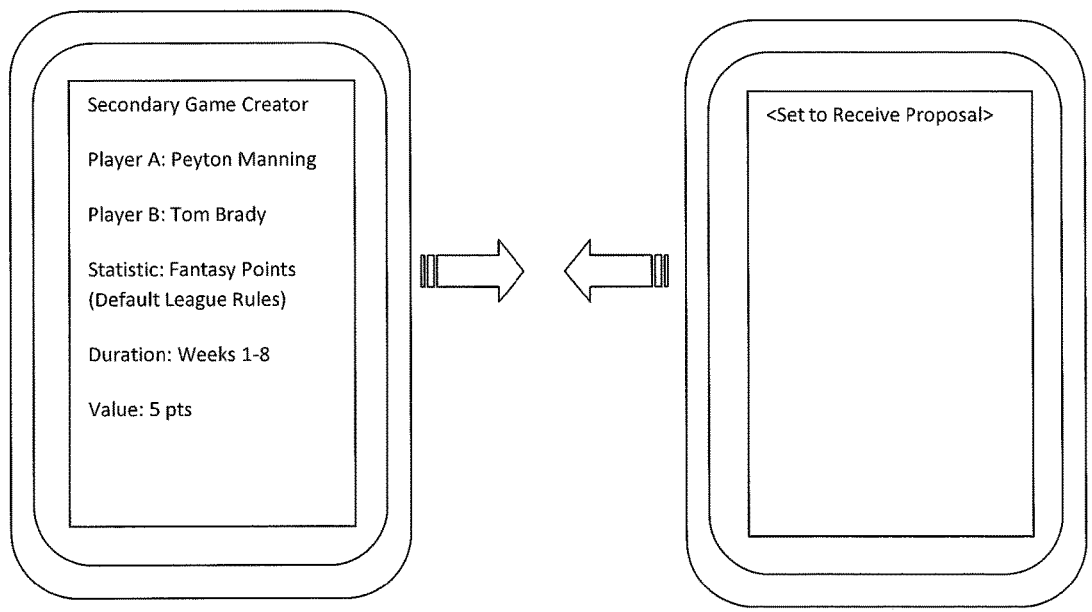
FIG. 26 illustrates exemplary mobile devices exchanging information through a bump, in which a first device includes a proposed game and the second device is prepared to receive it, in accordance with one or more embodiments of the present invention.
Figure 27:
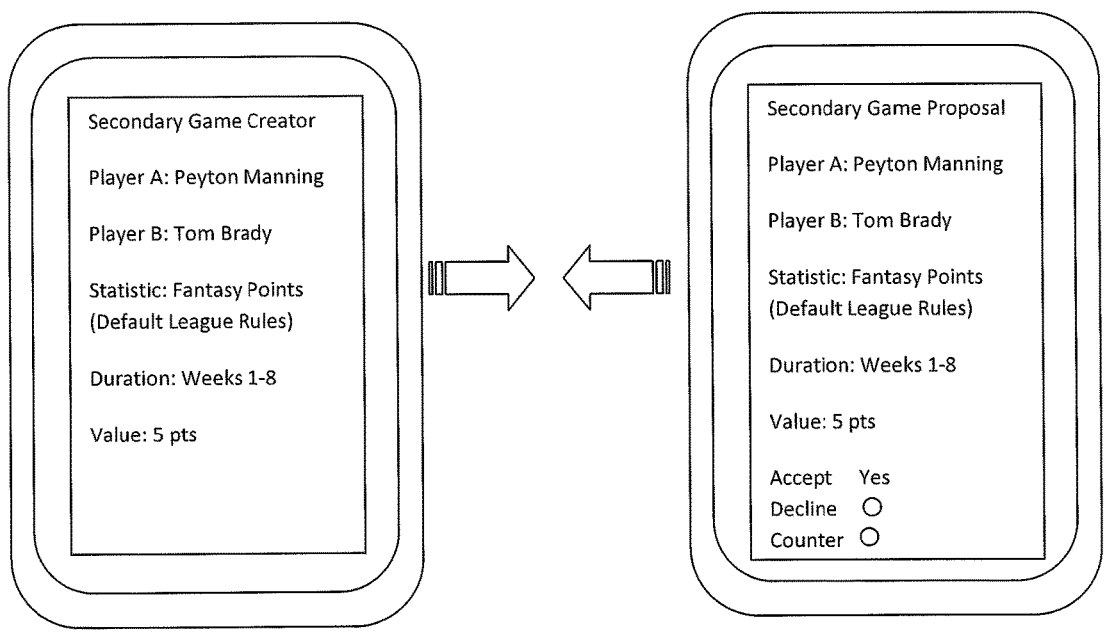
FIG. 27 illustrates exemplary mobile devices, the second device received the proposal and accepted, and then bumps the first device to confirm acceptance of the secondary game, in accordance with one or more embodiments of the present invention.

The present invention provides systems and methods to enhance the fantasy sports experience by providing a secondary competition to supplement the primary competition of a fantasy sports league. That is, embodiments of the present invention generally relate to a computer-implemented system, which may include one or more electronic devices functionally linked to create a network or communication channel therebetween and methods thereof of engaging in fantasy sports for reasons other than the conventional reason, which is building a fantasy team to win a fantasy league.

A primary game in fantasy sports is directly related to the objective of establishing a fantasy league for a given sports season to determine a fantasy sports champion from among the fantasy teams comprising the fantasy league. In contrast to a secondary game, the primary game conventionally lasts for the entire or substantially entire duration of the fantasy season. Typically, the primary fantasy game covers the overall competition between a fantasy league to become the overall league champion. Typically, the primary game is associated with a predetermined league entry fee or an initial consideration or value provided by the team owner to join the league. Thus, the primary game typically has the following parameters: 1) the duration is the entire fantasy season; 2) the statistics involved are fantasy points which are translated into league standings, which determine a winner by the league bylaws and/or rules; 3) the primary game has an initial, predetermined bet amount).

Secondary games as contemplated herein may last any duration, from an entire fantasy season to any increment smaller, and in some cases may last over multiple seasons. Secondary games refer to any other games related to fantasy sports statistics, typically involving a subset of fantasy players or a fantasy teams, outside of the competition to crown a fantasy league champion. The present invention takes advantage of a number of needs in the art, such as the prevalent need for person interested in fantasy sports to continue to compete in fantasy sports even if a person's fantasy team is doing poorly or the need to play in more fantasy games than just a fantasy league.

The present invention can be applied to fantasy sports and wagering. Wagering, gaming, betting, games of chance, games of skill, and gambling (each of which are interchangeably used herein) generally encompass competitions agreed upon by at least two parties, which may include for example two or more team owners of a fantasy league, two or more individuals who are not participants in the fantasy league, and one or more owners of the fantasy league and one or individuals who are not participants in the fantasy league. Wagering, betting, games of chance, and gambling are void where prohibited. Nothing in this specification provides authorization to play such games, particularly where prohibited.

Accordingly, the present invention provides systems and methods for secondary gaming (also interchangeably referred to herein as "side matches," "side bets," "side wagers," "props," "enhanced fantasy games," "supplemental games," or any combination of terms thereof) within one fantasy sports league as a supplemental game, across a plurality fantasy sports leagues (i.e., two or more fantasy sports leagues) so as to encourage participation from larger groups, or generally across of population of users not limited by membership in a fantasy league. The invention is applicable to any type of fantasy sports league or concept, rotisserie, head-to-head, or combinations thereof, without limitation to sports or professional or amateur sports leagues thereof. It is preferably that the real-life sport on which the activity is based have one or more parameters (i.e., a statistic or measurable value) measuring directly or indirectly, performance of a real-life athlete.

The secondary game as used herein encompasses any competition, contest, game of chance, bet, or wager between intra-league team owners, inter-league team owners (between members of two or more fantasy leagues), or a league owner and a non-league owner that does not cover only the primary fantasy game. The secondary games involve the performance of fantasy players, the performance of fantasy teams, or a combination thereof. A secondary game may last any duration of a fantasy season, including one game, a series of games, one season, multiple seasons, one or more sports, or a combination thereof. A fantasy game includes at least one measurable statistic other than the identical statistics and parameters thereof as used with the primary game. Moreover, a secondary game may also include any increase or additional amount of value wagered by a team owner already competing in a league on the primary game.

As briefly explained above, embodiments of the present invention are suitable for multiple purposes. For example, secondary games may act as a hedge against potential losses, expenses, or risks undertaken in fantasy leagues, games, wagers, or other endeavors. For example, a fantasy league may require a substantial cost (e.g., $100 to 1000) per season, while each secondary game may only be a low cost wager (e.g., $5). In preferred embodiments, hedging games may relate to hedging the fees paid for a fantasy league. That is, the participants in a secondary game play games of some incremental value, preferably each less than the cost (e.g., the initial entry fee, the aggregate of all fees paid, of the fantasy league).

The present invention may also be used as supplemental game, which can be played in addition to other fantasy leagues, wagers, and/or games. In certain circumstances, outcomes of secondary games (e.g., win or loss) may be factored into fantasy league standings. For example, each member of the fantasy league may be required by league rules to participate in five secondary games with each member of the league, and every ten secondary games wins are added as one fantasy team win with respect to the overall fantasy team season record.

Embodiments of the present invention involve two or more parties. Preferred embodiments involve two parties, each taking one side of a game or as would be understood more conventionally opposite sides of argument. Each side of a two-party game is mutually exclusive, wherein if party A wins, party B loses, for example. In some variations, games may be played by users in the same fantasy league. In preferred variations of the present invention, the participants in a game are members of the same fantasy league. In other variations, at least one participant (interchangeably referred to as users, party, gamer, individual, or entity), at least one party is in a fantasy league. In another variation, no participants in a secondary game are in a fantasy league, or at least are not in the fantasy league in which secondary games are placed or related.

In one preferred embodiment of the present invention, members of a fantasy league facilitate secondary fantasy gaming for members of the league. The secondary games may serve as a hedge or may serve as a supplement to the fantasy league itself, which offers an accolade and/or award for the primary purpose of winning the league (or placing second, third, or at some high level in the standings, for example). In this embodiment, any league member may propose a secondary game to a second party, who is in the league. While it is preferably that the second party is an owner of another team in the fantasy league, it is contemplated that one co-owner of a fantasy team in the league can propose, and enter into, a secondary game with his/her co-owner of the same team.

A fantasy season is a term that is generally known in the art to encompass the duration that a fantasy league will compete on the primary game. For example, for NFL professional football, the fantasy football season may last from NFL week 1 to NFL week 16. Generally the fantasy season will directly correspond to the professional sport. A fantasy season may start later than or end earlier than the corresponding professional sport but is the duration of the fantasy season is defined by each league. As used herein, "substantially an entire season" may include the regular season of a professional sports season excluding the playoffs of the sport in question and intervals generally regarded in the art as uncompetitive (such as week 17 in the NFL).

A fantasy owner as used herein is an individual, group of individuals, or entity that is a participant in a fantasy league. A fantasy league (referred to herein as "league") comprises a collection of fantasy owners, preferably between two and 100 teams, more preferably between four and thirty teams, even more preferably between six and eighteen teams. A league may be defined as a collection of fantasy owners operating under the same or substantially similar rules, particularly with respect to fantasy points (i.e., scoring). In some embodiments, a league may be defined as a collection of fantasy teams competing among one another to determine a champion. In some variations, a super league may include two or more leagues operating under the same or substantially similar rules, which provide for a champion within each league and a super league champion from among the leagues. For the purposes of this invention, the super league may be used treated as a "league."

As defined herein, "fantasy sports" encompass games of skill individual or team player performances, which are translated into statistics. The statistics are converted into fantast points, as governed by the bylaws or rules of each league. In certain embodiments of the present invention, the amount and type of consideration is determined mutually by the parties to the secondary games. In other embodiments, the type (i.e., monetary) and amount (charge per secondary game) consideration is predetermined by the system of the present invention, the house, or other administrator or provider of the secondary games.

As used herein, "consideration" is the value, commonly material value, put forth by the party engaging in the game and provides the risk or basis for the game and/or competition. Most preferably consideration is associated with a monetary value, or generally money or tangible currency. In some embodiments, consideration may include chattel, real property, property, specific performance, favors, or personal, generally intangible values, such as honor, pride, morality, indebtedness, and justice, for example.

Secondary games may include two or more parties. Any party, whether a member of a league or a non-member of a league, can play, initiate, request, operate, and/or or otherwise participated in a secondary game with respect to a specific league. Thus, the secondary games are playable by teams already in the fantasy league or by third parties, who are not a part of the fantasy league but who have identified a specific league. Two way bets (i.e., between two users) and three-way bets (i.e., between three users) are acceptable. There is no limit to the number of users who can be participants in one secondary game.

Some embodiments of the present invention allow multiple parties to enter into a secondary game. While it is preferred that each game involve two parties, games may involve: a) three or more parties; b) all the parties in a fantasy league; and 3) up to but not preferably exceeding the total number of parties in the fantasy league. Parties may include parties across two or more fantasy leagues.

Embodiments of the present invention may be provided to members of a fantasy league, or additionally to participants outside the fantasy league. A member of a fantasy league who wishes to participate in a secondary game is not limited to selecting players for the secondary game from the member's fantasy team roster. For example, a first fantasy league owner has a roster consisting of players A, B, C, and D. In a secondary game, the first fantasy league owner may select player E as the subject matter of the game. In other variations, the first fantasy league owner may select in addition or in alternative player's A, B, C, or D. A second fantasy league owner who participates in the same secondary game may also choose any player, including A, B, C, D, or E. In some embodiments, a player may be the subject of a secondary game if: 1) the player is selectable by the participant using the graphical user interface; 2) the player is available or can be added to the system electronically providing the secondary game; and/or 3) the player is a member of the professional league from which players can be selected.

In other embodiments a player from a first sport may be compared to a player from a second sport. In these embodiments, if a statistic common to the sport is available, it is preferred. It is contemplated by the present invention, however, that a player in the first sport may be compared to a player in the second sport using different statistics. For example, parties to the game may agree that a first statistic measures the first player and a second statistic measures the second player. It would be assumed that agreement by the parties would suggest that the first statistic and the second statistic can be compared to determine a game winner. In some embodiments, one or more statistics may be used to measure players among various sports. For example, a basketball player and football player may be the subject matter of a game, which is measured by Statistic A, which may be a newly developed statistic to measure athletic performance between athletes among two or more sports. As a hypothetical example, a statistic termed fantasy value may measure a player's fantasy value in the player's respective sport and the derived value may translate across other sports.

In some embodiments, the present invention may provide that at least one party acts as the "house," which offers, collects, registers, and otherwise organizes the secondary games to other parties. The house may include one or more users or entities chosen from the following: the league manager(s), one or more team owners in a league, a third party unrelated to the league (such as a casino or bookmaker), or any other party, which may represent a financial interest in the games. In embodiments of the invention, the house provides lines, spreads, odds, or other multipliers in conjunction with the secondary games. In other embodiments, the parties of the secondary game may preferably include teams within the league (i.e., intra-league). In certain embodiments, a party, such as the league manager, a fantasy team, a third party gambling venue (e.g., casino or Sports Book), or other party who is a member or non-member of the league, may provide odds of an outcome occurring, as would be known in the gambling art.

While certain preferred embodiments of the present invention include games between parties (such as between members of a fantasy league, two individuals, etc.), some preferred embodiments also allow games involving an entity accepting and/or offering secondary games (i.e., the house). In preferred variations, the game may be between one or more individuals and the house. More preferably, the game is between an individual and the house. In certain embodiments, the house may provide odds, incentives, or other game playing indexes regarding the return on investment.

Games may be offered in any format. For example, a user may play in a game one at a time. For example, the player can play in a second game after the conclusion of the first game played by the player. The user may also enter secondary games in conventional sports book formats, such as parlay, full cover, Trixie, each-way, combo bets or progressive parlay bets, for example. That is, it would be understood to one skilled in the art that any sports bet commonly or understood to be available with respect to professional sports may be adapted to the systems and methods of the present inventions by focusing on player performance and fantasy team performance. For example, the following bets may also be placed: 1) proposition games, in which odds and conditions of an event are the subject matter, 2) money line bets, in which 3) spread bets; 4) over/under bets; 5) parlays, which are games based on the outcome of two or more events, and getting higher odds than betting on the outcome of both events; 6) teaser bets, in which spread is adjustable based on multiple bets and/or consideration; 7) futures; and 8) run line, puck line, and goal line bets.

Each secondary game is comprised of one or more parameters that define the construct of the game. In the preferred fantasy sports-based secondary game, the parameters at least include: 1) identification of one or more players in one or real sports; 2) a statistic (or corresponding value) related to performance in the real sport; and 3) a time period over which the static is measured. In variations, the parties involved in the secondary game agree on one or more players whose fantasy value will be measured over a defined time period.

The player(s) involved in the secondary game may be any person, preferably an athlete. Even more preferably the player is a celebrity, or at least a publicly recognizable figure. The player may have any position, but preferably a position in which statistical performance can be measured. Preferably, in football, for example, the player may be a quarterback, running back, wide receiver, or individual defensive player. The parties to the secondary game can select the same player, meaning another variable involved in the game would have to differ to provide at least two outcomes and an inherent dispute in the game. Alternatively, the parties to the secondary game will pick different players, wherein the players are compared using the same statistic. A secondary game may include one player proposed by each party, as in the preferred embodiment, or may include additional players, such as more than 2, more than 3, more than 4, or more than 5, players.

The parameter (i.e., the statistic) relates to any metric, preferably quantifiable. Even more preferably, the statistic is related to the level of performance of one or more players, preferably each player. In preferred variations, the statistic is translated into a fantasy value or fantasy points, preferably in accordance with a defined set of rules.

In each secondary game, the parties may select fantasy points as the statistic. However, it is common in the fantasy sports industry for each fantasy sports league to define their own fantasy points, based on the rules of the league (e.g., touchdowns thrown by a quarterback may be valued at 4 points or at 6 points). That is, these rules may vary from league to league, so in some embodiments, users selecting fantasy points as the statistic can either define the fantasy points or may point to a published/available set of fantasy rules. In one embodiment of the present invention, the party proposing the secondary game can select the value of the fantasy points. If each party to the secondary game is in the same fantasy league, the parties can select the fantasy point rules from that league, preferably as a default option. In some variations, the parties can determine a fantasy point value that varies from that of the fantasy league. In variations, parties can select fantasy point values used generally in the industry, such as the default options provided by ESPN.com or Sportsline.com. If parties to a secondary game do not share a fantasy league, parties can select a fantasy point value that is mutually agreed upon.

A secondary game between two parties, in accordance with certain embodiments, may compare players using one or more of the same statistics (e.g., fantasy points, touchdowns, passing yards, etc.). That is, each party to the game selects separate players to be measured by at least one statistic, which preferably measures the performance of each player. While in the most preferred embodiments, players who are the subject matter of the game hold the same position; however, the players that are the subject of the game do not need to be of the same position, preferably if the statistic used to measure the players measures the players' performance and can be used to compare the players. For example, a quarterback may set against a wide receiver. It is preferred that the players are members of the same sport and it is more preferred that players may be member of the same professional or amateur league.

Any measurable and referenceable statistic may be the basis of a secondary game. For example, measurable statistics in football may include sacks, interceptions, touchdowns scored, yardage earned, fumbles, tackles, and kicks. In baseball, the measurable statistics may include hits, walks, strike outs, doubles, triples, home runs, errors, and earned runs. Games involving the statistical performance of players may be of any duration, such as a game, a group of games, a week of games, etc.

Each game has an associated period of time (also interchangeably referred to as "the period" or "duration"). Periods of time may last one real-life game for the player(s), or may last multiple games. Multiple games may be consecutive games corresponding to the schedule of the real-life sports (e.g., the first four weeks of the NFL season) or may be any chosen games, in any order (e.g., weeks 2, 5, and 11 of the NFL season). The period of time may include the regular season and/or the playoffs of the real-life sport, in some embodiments.

The duration of the secondary games is preferably defined by the participants. The secondary games may be designed to run through the fantasy sports season or for some predetermined interval, such as multiple seasons or less than an individual season, like a week, day, game, etc. For instance, two fantasy owners can engage in a secondary game that compares the accumulated points of their teams over a week period. In another example, two fantasy owners can agree on a secondary game to compare the total points accumulated by their respective pitching staff over the course of a season, or multiple seasons. In yet another example, two teams can agree on a secondary bet over the course of a regular season comparing total points between 4 players selected from each team.

In preferred embodiments, when different players are selected for a game, the period of time is also a common element. That is, the game concerns comparison of the players over the same time period. For example, Quarterback A may be compared to Quarterback B using accrued fantasy points (e.g., fantasy point rules agreed upon by the parties to the game) over the same weeks of the NFL season (e.g., Week 1, Week 3, and Weeks 13-16). In other embodiments, different players can be compared over different time periods. For example, the performance of Quarterback A may be measured over Weeks 1-3, while the performance of Quarterback B may be measured over Weeks 4-6. In some embodiments, the time period for each player may overlap, in whole or in part.

In other preferred embodiments of the present invention, the game may cover the performance of the same player, preferably using the same statistical measurement, using different time periods. For example, the parties to a game agree upon one statistic (e.g., touchdowns scored) to measure a player, e.g., Quarterback A. The first party selects Quarterback A's performance for a first period (e.g., Weeks 1-3 of the regular season) and the second party selects Quarterback B's performance for a second period (e.g., Weeks 4-6 of the regular season). The periods selected may overlap in whole or in part.

In accordance with the present invention, there is no restriction on types or the subject matter of a secondary game. For example, a user in a fantasy league may bet on his own team or players. Owners in the fantasy league may place secondary bets on their own league. Users who are not owners in the league can also place bets on the events and outcomes of the league. Any restrictions on gaming may be instituted by a league and/or a system providing the secondary games or a jurisdiction having laws or regulations.

Games may be created when at least two parties participate in a game. In variations of the preferred embodiment, the party proposing the secondary game may selected the parameters of the game, including definitive values for each variable, such as player(s) involved in the game, statistical metric, duration, and game amount (e.g., the number of credits or money at risk). The party receiving the proposed secondary game can agree to the parameters selected, or in some variations, can counteroffer parameters, which allows the party originally proposing the secondary game to become the party agreeing to the proposed game. It is contemplated that the parties involved in a secondary game may enter into lengthy negotiations, wherein each party can become, even multiple times, either the proposing party or receiving party. In the most preferred variation, upon acceptance of a secondary game (and its selected parameters), the secondary game is registered on the system.

If there are two parties, each party's position is directly opposed to the other party's position. In one embodiment, a party creating a game may submit the game to the system, without receiving express authorization from the other party. In this "pre-approval" variation, each party would preferably submit to acceptance of all games submitted to the system involving the party. The submissions are preferably presumptively valid, meaning that a party may undo the game.

Preferably, parties in such an embodiment have conducted game negotiations in advance or in a separate medium, and the party submitting the game would be deemed to have authorization to submit the game on behalf of the other party. Preferred variations would allow parties to submit supporting evidence (e.g., documentation) of agreement between the parties. In addition or in the alternate, the system may also allow parties to void a game within a predetermined period, such as 24 hours, 48 hours, or prior to time period as specified in the game or prior to the start of the game).

In preferred embodiments, a first party (also referred to as the "proposing," "negotiating," or "creating" party) creates the game and at least one second party (also referred to as the "receiving" party) accepts the game. In counter proposal scenarios, the creator and accepter may switch. Creation of the game requires entry of terms (e.g., players and/or fantasy teams involved, statistic, duration, and value). In some variations, the proposed game includes a complete set of terms so that the receiving party only has to accept a game. In other scenarios, the creating party provides the receiving party with any combination of required terms, preferred terms, suggested modifications, or general ideas. In some variations, the system restricts or limits certain terms (e.g., the system limits each secondary games to a $5 value).

The system allows one or more mechanisms for reaching an agreed upon secondary game. This mechanism is also referred to as the proposal and acceptance process. In one variation, users may exchange proposals and acceptances via a messaging system, preferably an "inmail" system operated or functionally affiliated with the system, or email, instant messenger, or other messenger system (e.g., messenger systems operated by Facebook® (Palo Alto, Calif.), Twitter® (San Francisco, Calif.), and LinkedIn® (San Francisco, Calif.).

In certain embodiments, particularly embodiments that provide a mobile, portable, and/or handheld device, the proposal and acceptance process may involve the first proposing party's device to recognize the accepting party's device, creating a communication link between the parties. The link may be provided through wired, wireline or wireless technology and/or through direct connection or a network, such a, for example a cellular, 3G, 4G, general packet radio service, local area network, wide area network, Wi-Fi, or Bluetooth network/link. In some embodiments, parties may still use email or other messaging over the networks. In preferred embodiments, parties can send or receive signals to one another so that proposals and/or acceptances are communicated. It would be understood in the art, that when a central system receives, processes, and/or stores game information, parties may communicate with the system through one or more of the same connections. In preferred embodiments, communication between any parties or between the system and a party is secure.

In one embodiment, each party is using an electronic device having an accelerometer and/or a global positioning system (GPS), wherein sending and receiving messages is controlled using algorithm(s) related to accelerometer and GPS data. In embodiments that allow a first user to send a proposal to a second user, preferably in real-time, each mobile device preferably includes one or more applications that can create two-way communication. In some embodiments, each user has to activate the application to create the connection. In other embodiments, the applications create a communication handshake, whereby two mobile devices can send and receive information between them. As are generally understood to those skilled in the art, the accelerometer data, the location of the handset, the IP address assigned and other relevant information to establish device identity, location, and action are collected. The data is entered into an algorithm to match each user's movement vector against other bump vectors to determine linking between two devices.

A more preferred embodiment uses information sharing technology such as Bump® by Bump Technologies (Mountain View, Calif.) or Mover® by Infinite Labs (Italy). Each of these technologies allows applications on the Apple iPhone® to swap information between two iPhones. Generally, using Bump technology, users would preferably activate the Bump® application on their respective devices. The proposing party would create a secondary game, as discussed herein, by entering terms. Parties communicating with one another are preferably registered with a system, and credits and payment rules are already established, and therefore no physical exchange of valuable consideration between the parties is necessarily required. In accordance with Bump technology, the proposing party physically bumps his device with that of the receiving party. The receiving party inputs acceptance, rejection, or a counterposition, for example, by selecting the corresponding response in the GUI. The receiving party may also block transmission from the proposing party in certain variations. In some variations, if the game is accepted, the game is submitted to a central system. In other variations, if the game is accepted, such information is recorded on each party's device. In preferred variations, after the receiving party accepts the game, the parties bump their devices, thereby confirming the existence of a secondary game. The game details may be sent to a system for further processing and/or storage, for example.

The secondary games of the present invention may include any combination and any number of games in succession or concurrently. Because of the plethora of combinations of statistics that can be used as the basis of a secondary game, numerous secondary bets can be placed. For example, a team owner may bet a third party that his team finishes higher in the standings than the third party's team and the team owner's first baseman will have more homeruns in the first half of the season than the third party's first baseman. The team owner can make the same bet with another team in the league.

It is contemplated by the current invention that participants can enter one or more secondary games, concurrently or serially. In one embodiment, users may customize user preferences, for example, on the site administering, hosting or otherwise providing the secondary games, to dictate the number of secondary games in which the user may participate. For example, the user may limit the number of total games or concurrent games per day, week, month, or year. Users may also limit the number of games against particular parties, involving certain players. In games involving a value, such as in credit, money, or other consideration, users can determine limits on "spending." For example, the user may limit the total amount that can be played at one time, or in a day, week, month, or year, for example. In certain embodiments, the system can provide user limits, such as those mentioned above.

Moreover, there is no restriction on placing duplicate games by the same user. There is no limit on the number of secondary fantasy games with respect to any given fantasy league at any given time. In accordance with embodiments of the present invention, the users of the secondary games may participate in games involving the performance of fantasy teams and the performance of individual players, at the same time or in succession.

Certain secondary games related to the performance of fantasy teams are generally known as herein as "fantasy sports futures" (also interchangeably referred to herein as "futures"). As known in the gambling art, futures are wagers placed in advance of an outcome of an event, which is determined at sometime in the future. As would be understood to one skilled in the art, futures bets may be represented by basic or fixed odds, (including moneyline or multiplier features) with the award (e.g., payout where cash consideration is not prohibited) dictated by any posted odds.

Thus, the futures secondary game is to determine the outcome of a fantasy team over the course of a predetermined time period under league bylaws and/or rules. Typical outcomes considered for a fantasy league includes such items as a regular season winner, the standings with respect to one or more fantasy teams (such as the second place winner, the third place winner, teams in a winner's bracket, etc), winners of subunits of the leagues like division or conference winners, and winners of a partial season.

The future may identify the duration of the fantasy season or for any part thereof. For example, in some embodiments the future may directed to the team with the best record/most points at the All-star break in the sport, the team with the best record/most at the end of each month, or the team with the best record/most points in a particular week. In most preferred embodiments, the future is the defined as the outcome at the end of the fantasy season. In even more preferred embodiments, the future is defined as the outcome at the end of the fantasy playoffs.

Thus, an owner of a fantasy team in a twelve-team league that is competing to be the overall champion in fantasy points at the end of the season as the primary game, can also place a secondary wager with any party, such as one or more parties in the league, betting that it will become the best team in the league. For instance, the team can provide consideration in addition to the initial consideration of or joining the league.

Fantasy league manager software (also referred to herein as "league software") is generally known in the art and is provided via a network (such as the Internet, LAN, WAN, etc.) to a population of users. Exemplary software is provided by www.espn.com (ESPN, Bristol, Conn.), www.CBSsports.com (CBS, New York, N.Y.), and www.yahoo.com (Yahoo!, San Francisco, Calif.) as of the writing of this specification. The software generally provides a graphically user interface (GUI), such as a website or webpage available by using a browser, such as Explorer by Microsoft Corporation (Seattle, Wash.), for example, allowing users to interact with the software and the services and/or the electronic databases functionally linked to the software. These conventional systems do not provide secondary fantasy games.

Embodiments of the present invention may be provided to the user as a stand alone software or application, such as in a widget or program available on computer. Some embodiments may be integrated in existing software. In some variations, an "App" provides all functionality required and may be installed at each user.

Embodiments of the present invention are generally illustrated in FIGS. 1-25, which provide an exemplary website of a system providing secondary games. For example, a first user initiates a game by interacting with the graphical user interface. The first user selects one or more parameters to define the game. For example, the user selects the players (also referred to generally as performer or entertainer), the time period, the relevant scoring statistics, etc. In preferred embodiments, the graphical user interface provides menu choices that are selectable by the user.

Once the first user completes the game parameters, the first user transmits the proposed game to at least one recipient user. The recipient user can accept, decline, or counter-offer. In some embodiments the system transmits a request to participate in a secondary game to potential participants, at the same time or substantially the same time, or sequentially. The system can be programmed to identify potential participants. In some cases, the system may send requests to a finite number of potential participants. The system may wait for some or all of the participants to respond affirmatively, or may act in a first come first serve manner. In other variations, the system can send requests to large groups of recipients, and based on those responding group participants. For example, the system may send, broadcast or transmit a request for participation, and as participants respond affirmatively, they are group in the order they respond, or in some other manner.

In some embodiments, the system and methods for executing a secondary game is similar to offering and accepting trades through a fantasy sports commissioner system, as would be understood to one skilled in the art. Generally, players can be selected by one party, and the trade is proposed to a second party, who can then take action on the proposed trade.

Secondary games in accordance with the present invention may be provided on any platform, including a website, which may provide only secondary game functionality, or some level of integration between the secondary game and fantasy leagues. For example, the system of the present invention may be a white label solution or as a component of a fantasy commissioner platform, such as ones offered by www.espn.com, www.yahoo.com, or www.cbssports.com, for example.

The system may provide user customizations. For example, users may customize communication frequency and type, game parameters (e.g., maximum/minimum bet, preferred or banned parties,) and other features. The system may customize the system, such as determining game types, game amounts, etc. For example, the system may not allow games over a certain value.

The system of the present invention preferably includes functionality to send, receive, and process games. Preferably the system can store and display games, as well. The display module provides a graphical user interface (GUI) for users providing game information, such as pending games, expired games, and other relevant information, such as social features, voting, and news, for example.

Variations of the system also offer membership and security services to users. The system providing secondary gaming functionality may include a communication module allows the system to send and receive data. Communication may be established with users, for example, to receive game submissions. The communication module may also establish communication with data sources, such as a data feed or news feed, which can provide sports information, particularly when to close a pending secondary game and preferably settle debts on the secondary game. Additionally, the communication module allows external and internal links to messaging systems and social networks. The system may further include a time module, which may include calendaring and scheduling functionalities.

In some variations of the present invention, the system may provide a secondary game marketplace. The marketplace includes games proposed by proposing party, or the system itself, without an acceptance from a second party. Thus, these games are available for users to accept, and the marketplace functionality essentially creates a forum of one or more one party secondary games waiting to be accepted by users. In some scenarios, when the one party game in the marketplace is accepted, the same game cannot be accepted by other secondary parties. In some variations, a marketplace one party proposal may be accepted by more than one receiving party, meaning the proposing party would be involved in a secondary game with each receiving party who accepted.

The system of the present invention may be comprised of one or The system may include an accounting (also referred to as a "payment" or "finance") module. The financial module addresses all payments, whether in tangible currency (e.g., money), system credits, anything of value or any other consideration, which may form the basis of the game between parties to a game. For the purposes of the present invention, the term "money" may represent any valuable consideration wagered between the parties. In jurisdictions in which wagering, betting, or gaming prohibits the exchange of money or other value, this disclosure is not intended to promote, solicit or suggest any illegal acts.

In preferred embodiments, each user is provided with an account. It would be understood to one skilled in the art that user accounts may be secure and linked to user registration, which is preferably required. User accounts may be linked to financial institutions, such as banks, online payment systems (e.g., www.paypal.com) (eBay Corporation, Calif., USA), credit services, credit cards, or debit cards. Users, preferably registered users, can deposit money into an account, providing credit and/or collateral for games proposed or accepted. In some embodiments, users may be "verified" or provided credit by the system or a third party.

In some embodiments, particularly where the system of the present invention does not provide an account and/or where users prefer not to create deposit accounts, users may engage in a pay-per-play environment. That is, when a game is created, and a value submitted, the user performs a transaction, such as a bank transfer, Paypal® transfer, or credit card transaction, to pay for the game being created. If multiple games are created, multiple charges may be applied to account for each game.

In yet additional embodiments, where allowed, the system may charge users a commission or other charge for creation, acceptance, and/or submission of a game. Charges, for example, may be assessed on the creator of the game and/or the accepter of the game. If both parties are charged, the proportion of charge may vary, in accordance to customizations, and may include the same charge for each party. For example, where allowed by law, the system may charge a fee for each game. Multiple games may charge a flat rate, a per-game rate, or other computed rate. In another example, the system may charge an amount proportional to the value of the game. Charge rates or percentages may be determined by the administrator of the system or other party governing the system.

Valuable consideration, which is the subject matter of a game, is transacted: 1) directly from the losing party to the winning party, or 2) from each party to the system (or other third party) in escrow to the losing party. In certain embodiments, consideration is transferred from the parties at the time of the game is created and/or accepted and/or submitted. In variations, the consideration may be held in escrow, preferably in an interest bearing account, until at least the end of the game or a result determining the outcome of the game. In embodiments having a deposit account, the account is balanced and debits and credits are adjusted routinely (e.g., daily) or periodically (e.g., at the discretion of the administrator).

In preferred embodiments, all accounts are settled (winnings paid out and losses debit from accounts) upon completion of the game, preferably where the system receives a data feed providing real-life sports data and/or calculation of winners/losers in the secondary game. In other embodiments, the system may complete an accounting (e.g., such as determining debit and credits in user accounts) at some predetermined time, such as at the end of a week, month, quarter, or year). In the event that a user has multiple secondary games pending, accounting of those games may be done a per game basis, at the completion of certain or all games, or at a predetermined period. If agreed to by the parties, or provided by the system as an option, payments may be provided in installments or financed.

The system of the present invention preferably includes a publishing module, which can post or communicate system information, such as active secondary games or suggested games, through any communication system, including for example, email, social media (www.facebook.com or www.twitter.com).

A game module allows parties to create and/or register games. The gaming module may allow the system to act as the "house," which may include functionality such as suggesting potential games and developing "odds."

The system administering the secondary games may accept "piggyback" games. Piggyback games for the purposes herein are any games based on a pending game. For example, User A and User B submit a game in which User A predicts Quarterback P will have more fantasy points in week 1 of the NFL regular season than Quarter R, who User B selected for the same week. Users C and D may place a secondary bet on the same game. Users C and D may adjust the parameters of the original bet between Users A and B. In certain embodiments, piggybacking the bets allows the system to pre-fill variables in the game creation form. In certain embodiments, the pre-filled variables may be adjusted by the users creating the piggyback game.

The present invention preferably provides a system to provide secondary games through the league software, as an 1) integrated secondary gaming and league software suite; 2) a preferably premium, add-on feature that can be to any league software; and/or 3) an independent module or system with GUI and electronic database that is functionally linked to the league software or information therefrom. The system provides an administrator of the secondary games with an electronic, automated, and preferably real-time, or substantially real-time, functionality. The system may be seamlessly implemented with the league software.

When the system is functionally integrated or featured as a part of the league software, the system allows users operating the fantasy league manager software to propose, present, post, record, monitor, update, and otherwise define a secondary game. Typically, in this embodiment, the system of the present invention and the league software appear to have a similar GUI (e.g., the look, the feel, and/or the trade dress of the GUI appears to be uniform and seamless). Moreover, this functionality is achieved by a partnership or affiliation between the system and league software or by an agency function.

The league software seamlessly provides this information via the GUI to the team owners or to any other authorized party. Thus, first team owner may propose a secondary game to one or more other team owners by selecting the parameters of the wager and then requesting acceptance or modification of the parameters by the one or more team owners. Once mutual consensus is reached on the parameters of the secondary wager, the wager is posted to the league and other authorized parties for review, comment, recordation, archiving, acceptance, updating and monitoring, as necessary.

The party wishing to make a wager can select one or more wagers. Additionally, where allowable, the party can indicate a value of the wager or consideration for the wager (e.g., a cash amount). Once the party submits the wager to the league software, as would be known to those skilled in the art of GUI (e.g., by clicking a radio button marked "submit"), the league manager processes the wager. In certain embodiments, the league managers posts the wager to folder, file, or page on the GUI for review, monitoring, recording, archiving, commenting, and updating, as necessary.

The league software may also provide or host a page of predetermined or selected secondary wagers for acceptance by any party entering the page. In one variation of this invention, the page may list each of the fantasy teams in the league, and the rosters thereof, and associated odds for each fantasy team for winning the overall league championship. The user may select a team, provided a consideration amount where applicable, and submit the bet. The bet is then registered, and preferably posted to the user's account and/or to a league GUI webpage, for example. More specifically, for any fantasy league, one or more wagers may be posted to the league or other designated GUI and/or transmitted to a designated user.

In some embodiments, the system of the present invention provides functional access to league software but is either provided as an add-on feature/module to the league software or as a system independent from the league software. For example, this scenario may arise when the system is provided to a fantasy league, but the system is not expressly authorized, paired, or partnered with the league software. In this scenario, the system of the present invention may seamlessly connect with the league software nonetheless. In certain variations, the system may provide an independent GUI, distinct from the GUI provided by the league software.

The system may be functional based on uploading or data sharing between the league software and the system. As would be known to one skilled in the art, the system may be connected to the databases and electronic information of the leaguer software, such as league rules, fantasy rosters, and schedules, for example, and provide this information to a user. The user would select one or more secondary wagers as described above. Wagers may be posted, monitored, recorded, archived, and updated on the GUI of the system. Similarly, in this scenario, the system may provide one or more wagers for acceptance and submission by the user and these wagers may be posted for accessing using the GUI of the league software.

In some embodiments, the present invention provides notification and accounting of the secondary game. At the conclusion of a fantasy game, i.e., at the end of the duration mutually agreed upon by the parties to the secondary game, the system may provide an alert to the league, to the parties to the secondary game, to a predetermined user list, etc., that a winner of the fantasy game has been determined. In some variations, the system accounts for the consideration offered by each party. In some other variations, the system allocates the consideration to the parties of the secondary game. For example, if the secondary game included a twenty dollar bet between two parties, the system debits the losing party by $20 and credits the winning party by $20.

In yet other embodiments of the present invention, particularly in which monetary consideration is accepted, the system is functionally linked with a user's finances. In a variation, the system confirms sufficient funds by the party in order to engage in secondary games. In other variations, the system registers the user's financial payment method, and reconciles the user's registered account on a periodic, regular, or scheduled basis, or before, after, or during any secondary game. The collection of monetary consideration and confirmation and distribution thereof would be known to one skilled in the art.

In order to provide secondary fantasy games to parties who are not owners in a particular fantasy league, i.e., an "outsider", the present invention provides a system or administrator that allows the outsider to review the league, as if the outsider was a member of the league, but without any modification rights, as would typically be held by a team owner that is a member of the league. Accordingly, the outside can view information, such as team rosters, player performance, statistics, fantasy points, and rules.

The system may optionally display outsider bets on the GUI for the league. For example, if a team owner and a friend of the team owner who is otherwise not a member of the league engage in a secondary game, the recordation of the secondary bet may be available on the league software or league website. It is preferred that outsiders without any personal connection to a fantasy league be provided with a system of the present invention which does not interact with the league, the interplay of the teams in the league, and is substantially transparent and unobtrusive.

In certain embodiments, the outsider may access a GUI interface that identifies leagues that are selectable by the user. The user can select individual leagues, optionally review information about the league and concerning the fantasy statistics and teams in the league, and can place secondary wagers on aspects within each league or across leagues. The outsider would be provided a summary, via GUI, hardcopy, or other display of the secondary games selected by user and/or the results thereof. Personal display units may be provided in casinos, sportsbooks, or other gambling venues to provide monitoring of the outsiders games.

As would be understood in the art, the present invention applies to any fantasy league measuring statistical performance and converting statistical or measurable performance with a point value. With respect to fantasy sports, the invention may be used in conjunction with any fantasy sports league corresponding to any real sport, such as but not limited to basketball, baseball, auto-racing, soccer, football, hockey, golf, racing, tennis, or bowling, for example.

In embodiments of the invention, a GUI would allow the user to control and personalize the secondary games. For example, as shown in FIG. 1, the user may register an account, as shown in step 10, and then access the account using user selected authorization codes, as shown in step 12. In certain embodiments in which the system is integrated with the league software, the account for the secondary gaming functionality is the same as the account for league software and management of the owner's fantasy team. The user selects a menu for secondary games, chooses to design a secondary game based on parameters such as duration of the game, nature of the contest, and consideration, chooses the requested parties to the secondary game, and submits the secondary game for registration. The system receives the user's submission and contacts the parties. The methods to contact the parties would be generally known in the art, and may include email, instant messaging, messaging, voice communications, or otherwise notifying. If the requested party is a team owner in the league, a message within the league manager is preferably automatically sent. Upon acceptance, the system posts the secondary game for access and review by the parties, other designated by the parties, and/or the league. In some instances, the system automatically debits a charge card associated with each party for the amount of the consideration and/or any administrative fee, if present.

In certain variations, the parties may modify the secondary game. Preferably, all parties should consent to modification of the secondary game before changes are implemented. As shown in FIG. 1a, at least one party, selects the secondary game from the GUI, and then changes one or more parameters of the game. Once the changes are submitted by the user, the system preferably provides the remaining parties with an opportunity to comment, approve, or modify the secondary game. The modified secondary game is reposted on the GUI.

To calculate the secondary game, the system review statistical data and coordinates it with the parameters selected in the secondary game. For example, as shown in FIG. 1c, the system processes the submitted secondary game and marks the game for statistical update. In preferred embodiments, the data feed and calculations of the parameters are in real time. It is also preferred that the calculations and updates to the parameters is displayed on the GUI in real time. At the conclusion of the time period of the secondary game, the system preferably provides a final update of the results. Preferably, the system debit and credits the parties as necessary.

In certain embodiments, the system provides users with an account summary of secondary games entered, in progress, and statistics relating to the wins/losses in secondary games, gross and net consideration related to the secondary games, and commentaries between users, for example.

The fantasy sport may correspond to any number of professional leagues. The following exemplary list is provided for illustrative purposes and is not intended to exclude any sports association, federation or group having athletes accruing statistics: such as Major League Baseball, National Football League, National Basketball Association, Arena Football League, National Hockey League, all collegiate sports, such as those administered and/or or governed by the National Collegiate Athletic Association, the National Association for Stock Car Auto Racing, Professional Bowler's Association A, Professional Golf Association, International Federation of Association Football, or International Tennis Federation.

Exemplary professional soccer organizations include the English Premier League, German Premier League, Spanish Premier League, Portuguese Premier League, French Premier League, Italian Premier League, Dutch Premier League, Scottish Premier League, Turkish Premier League, Austrian Premier League, Swedish Premier League, Finish Premier League, Russian Premier League, Polish Premier League, Greek Premier League, Irish Premier League, Brazilian Premier League, Argentinean Premier League, Mexican Premier League, Chinese Premier League, Japanese Premier League, Indian Premier League, Australian Premier League, and Major League Soccer.

Games may include head-to-head match ups, which pits a first set of one or more fantasy players against a second set of one or more players. The head-to-head system also includes secondary games pitting first fantasy team against a second fantasy team Embodiments of the present invention provide secondary games involving fantasy teams competing in fantasy leagues. In one variation, owners in a fantasy league, already competing for an overall league championship, may establish a secondary game wherein one fantasy team is set against another fantasy team. For example, a secondary game may involve User A selecting Team C and User B selecting Team D in week 4 in the head-to-head matchup of Team C and Team D in week 4 of the fantasy league.

It is preferred that games related to the outcome of fantasy teams involve parties who are members of the fantasy league. In certain variations, in which one party to a secondary game involving fantasy teams is not a member of the fantasy league, it is desirable to provide certain safeguards or regulations to avoid accusations that the fantasy teams were manipulated. It is conceivable under the present invention that parties, who are not members of a fantasy league, can implement a secondary game involving fantasy teams within the fantasy league. For example, User X and User Y enter a secondary game in which User X selects Team J and User Y selects Team K in the head-to-head matchups between Team J and Team Y in Weeks 4 and 12 in Fantasy League Q. User X and User Y in this example do not have to be members of the fantasy league. It is preferable that when parties are not members to the fantasy league that they are provided with some observer access to the fantasy league. It is also preferable that parties who are not members to the fantasy league have no ability to manipulate the team rosters, starters, or other factors that may affect the head-to-head matchup(s).

In certain embodiments, secondary games involving fantasy teams may involve either head-to-head matchups between fantasy teams or fantasy standings, particularly in rotisserie leagues. Games may involve standings at any point in the fantasy season, including the final standings. Like other secondary games discussed herein, secondary games involving fantasy teams may also include any time period.

EXAMPLES

Example 1a

A twelve team fantasy football league is primarily based on head-to-head competition between teams over the course of a season. Each fantasy team accrues wins/losses and the wins/losses are compared among the fantasy teams to determine the fantasy team with best overall winning percentage, i.e., best overall record. Thus the primary goal of each team is to attain the best record, and the team to do so is declared champion of the league.

Team A, which includes Peyton Manning as its quarterback, challenges Team B, which includes Tom Brady as its quarterback, to a secondary game comparing the total amount of points earned by each quarterback over the course of the regular fantasy football season. The winning team is given a prize agreed upon by the fantasy owners of Team A and Team B. That is, if Peyton Manning scores more total points (under a set of league rules) than Tom Brady, then Team A wins the challenge and an associated prize determined between Team A and Team B. Alternatively, if Tom Brady scores more points than Peyton Manning over the course of the fantasy football season, then Team B wins the challenge and an associated prize.

Example 1b

The same scenario as described in Example 1a, except that the performance of the quarterbacks is measured for a period of 3 weeks, which is the time frame agreed upon by Team A and Team B, or otherwise defined as the timeframe of the challenge, such as because decree of the league commissioner or league bylaws.

Example 1c

The same scenario as Example 1a is used except as follows. Team A drafts Peyton Manning in the first round of the draft. Team B mocks Team A for selecting Team A, and Team B, in turn, selects Frank Gore. Team A challenges Team B to determine which was a better pick Peyton Manning or Frank Gore. Teams A and B agree to terms, and determine, in part, that the fantasy team having the player (Frank Gore or Peyton Manning) accruing the most points over the course of the season will be deemed the winner.

Team A registers the challenge on the software governing the league. Team A can select an option to view, update/modify, other cancel the challenge. In preferred embodiments, both Team A and Team B must agree to any update, modification, and/or cancellation of the challenge.

Example 2a

Two fantasy baseball leagues, each consisting of multiple fantasy teams are formed. Team Y from League I and Team X from League II agree to a challenge to determine which fantasy team drafted the best fantasy team over the course of the fantasy season. Based on an agreed upon set of rules, which can be obtained from League I, League II, another league, or an amalgamation of one or more leagues, the teams register and/or post the challenge on the software governing each of their leagues. Alternatively, the challenge may also be registered and/or posted to only one of the leagues, or to a third party league or software site. Both Team Y and Team X agree to the number of players on each fantasy team that comprises a full roster. The total points earned by Team Y and the total points earned by Team X over the course of the fantasy season are tabulated and compared. The team with the most points is declared the winner.

Example 2b

The same scenario as described in Example 2, except 10 fantasy leagues exist. At least one team from each fantasy league submits to the challenge.

Example 2c

The same scenario as described in Example 2, except that Team Y and Team Y agree to each select 5 players for comparison in the challenge over the course of 10 weeks of the professional sports season.

Example 3

In a particular fantasy soccer league which incorporates players from a number of worldwide professional soccer leagues, Team G and Team H agree to the following trade: Team G trades to Team H David Beckham of Major League Soccer (USA) and Thierry Henry of La Liga (Spain) and Team H trades to Team G Wayne Rooney of the English Premier League (Great Britain) and Patrick Vieira of Serie A (Italy). Team G is hesitant to complete the trade. Team H convinces Team G to complete the trade by indemnifying the trade value of the players involved in the trade. That is, Team H says that it will provide Team G with some compensation if the total fantasy points accrued, in accordance mutually selected fantasy scoring system, by Wayne Rooney and Patrick Vieira are not within 10 total points of the total fantasy points accrued by David Beckham and Thierry Henry over the remaining ten weeks of the fantasy sports season of the league.

After completing the trade, either Team G or Team H registers the conditions and parameters of the trade on the league governing software to be displayed to the league constituency for at least the remaining ten weeks of the fantasy sports season. In certain embodiments, the challenge is retained for extended periods, such as from season to season in an archived database.

Example 4a

In a fantasy basketball league, Team J is playing Team K in the first round of the fantasy sports playoffs. Team Q challenges Team J on the outcome of the Team J and Team K match. Team Q and Team J agree to the rules and parameters of the challenge, which primarily concerns the winner between the Team J and Team K match.

Example 5

At the beginning of the season, the league commissioner assesses the rosters for each of the teams in the league and then assesses the probability of each team winning the championship, as defined by the league. The commissioner posts a challenge for person to successfully predict the champion of the league. In preferred embodiments, the commissioner odds for each team, e.g., Team CC has a 3:1 chance of winning the championship. Team PP has a 7:2 chance of winning the championship, etc. Team owners within the league, and in some embodiments team owners from other leagues, or any person/entity, can register its collateral for the challenge. Where acceptable, person named Mr. Quince Quistoferson, accepts the commissioner's challenge and places 10 fantasy dollars (or 10 value units) on Team CC winning the championship. The commissioner records Quince Quistoferson's registered challenge of the league software or accessory league software along with any other challenges.

Example 6

In a particular 5×5 rotisserie baseball league, Team P, Team Q, and Team R agree to a challenge one another on which team accrues the best statistics, among three statistical categories. The statistics can be selected from any combination of statistics commonly kept by the league manager or accessible by the league software or other calculable statistic. The statistics may be selected from the ten statistics which form the basis of the 5×5 league, or other statistic. In this scenario, the teams agree to assess the challenge based on 1) Runs Batted In; 2) Batting Average; and 3) On Base Percentage. Each team is ranked in each category during the mutually agreed upon time period. The ranking for each team based on the aggregate rankings is calculated and a winner is determined.

Example 7

Espline provides league management software to 5000 fantasy football leagues. Espline provides a streamlined review of any of its 5000 leagues to any of its online subscribers via the Internet. Thus, the subscriber can view a limited amount of information in each league, such as the teams, the rosters, the league rules, and schedules. Subscriber reviews the QFL and its twelve teams. The subscriber, who also has an account to engage in secondary games, chooses the team named Quince United to win the championship of the QFL. The odds of Quince United winning as determined by the Espline administrator are 10 to 1. The subscriber remits $10 and the system records the wager. Espline provides confirmation to the subscriber of this bet and places a copy of the wager on a webpage accessible through the subscriber's account.

Example 8

Figure 28:
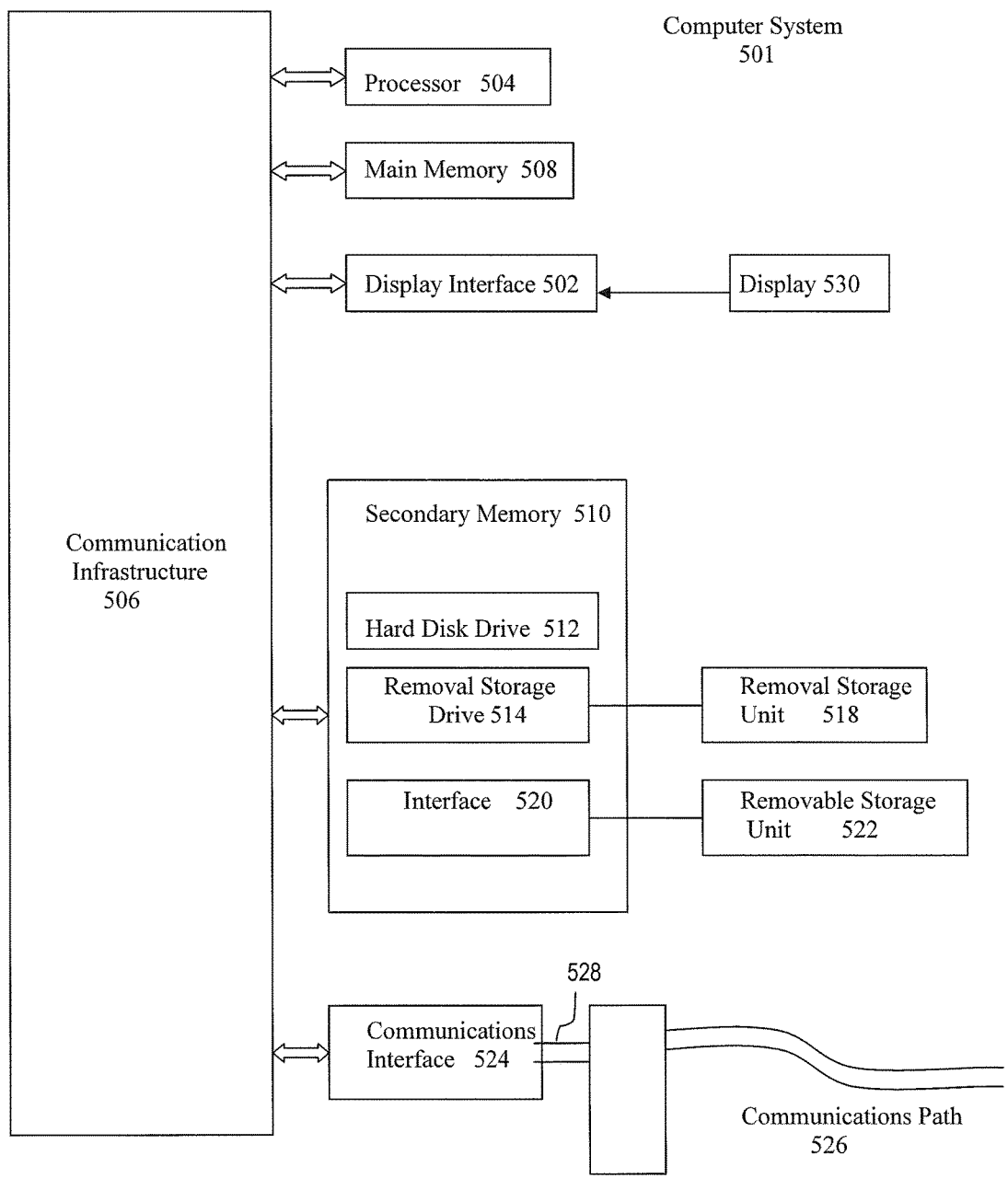
FIGS. 28 and 29 illustrate exemplary system architecture, in accordance with one or more embodiments of the present invention.

Two parties watching a baseball game wish to engage in a secondary game using a mobile device. The first party proposes that player A playing in the baseball game will have a batting average greater than 0.250 at the end of the game. The first party completes a secondary game form recording the proposed game and communicates it through a shared WiFi network to the second party, who can then accept, decline, or counter. The second party accepts, and communicates acceptance to the first party, and preferably a central system that records secondary games. The game is established for 20 points of credit each. As members of the system, each party had previous established a deposit account, allowing each party to select the appropriate amount during the game formation process. At the completion of the game, the first party wins. The system receives data regarding the outcome of the game, and balances the accounts by moving 20 points to the first party's deposit account and debiting 20 points from the second party's deposit account. In some embodiments, the system charges each party a transaction fee of one point, which is deducted from each party's account when the game is confirmed with the system Exemplary Processing System Components and Functionality The present invention may be implemented on a non-transitory computer-readable medium using hardware, software, or a combination thereof and may be implemented in one or more computer systems or other processing systems. In one embodiment, the invention is directed toward one or more computer systems capable of carrying out the functionality described herein. An example of such a computer system is shown in FIG. 28.

Computer system 500 includes one or more processors, such as processor 504. The processor 504 is connected to a communication infrastructure 506 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 500 can include a display interface 502 that forwards graphics, text, and other data from the communication infrastructure 506 (or from a frame buffer not shown) for display on the display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 514, a hard disk installed in hard disk drive 512, and signals 528. These computer program products provide software to the computer system 500. The invention is directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features of the present invention, as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512, or communications interface 524. The control logic (software), when executed by the processor 504, causes the processor 504 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 29:
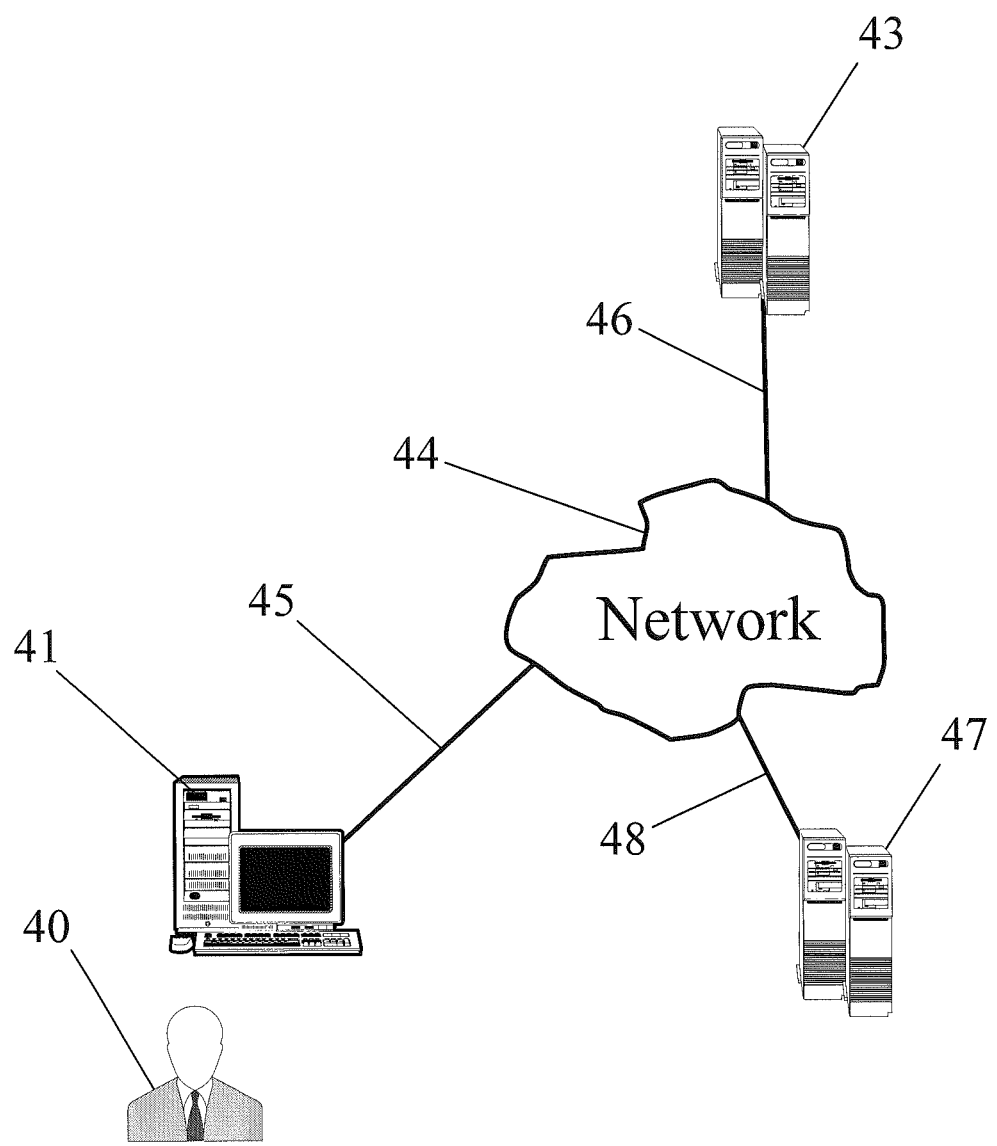

As shown in FIG. 29, in an embodiment of the present invention, the multimedia application operates, for example, on a network. A user 40, such as an applicant or application processor inputs information, via a terminal 41, such as a personal computer (PC), minicomputer, mainframe computer, microcomputer, telephone device, personal digital assistant (PDA), or other device having a processor and input capability.

As further shown in FIG. 29, in one embodiment, the terminal 41 is coupled to a server 43, such as a PC, minicomputer, mainframe computer, microcomputer, or other device having a processor and a repository for data or connection to a repository for maintained data, via a network 44, such as the Internet, via couplings 45, 46, such as wired, wireless, or fiber optic connections.

Although the above problems have been discussed in the context of continuing medical education of health care providers, in order to improve quality of health care, these same problems are present in other areas where proper or current education is fundamental in improving quality of service. For example, such problems are present in information technology, airline pilots, mechanics, lawyers, and other areas. The present invention, however, is not limited to any particular profession, occupation, or type of service.

Although preferred embodiments of the invention have been described in the foregoing description, it will be understood that the invention is not limited to the specific embodiments disclosed herein but is capable of numerous modifications by one of ordinary skill in the art. It will be understood that the materials used and technological details may be slightly different or modified from the descriptions herein without departing from the methods and compositions disclosed and taught by the present invention. Many variations and modifications will be apparent to those of ordinary skill in the art.

What is claimed is:

1. A computer-implemented method of providing a secondary fantasy sports game to supplement a primary fantasy sports game of a fantasy sports league, the fantasy sports league including a first participant, a second participant, and a plurality of fantasy players corresponding to real-life players of a sports game, the method comprising:
    establishing an electronic communications connection between a network server and an account server holding an account for each of the first and second participants;
    providing a graphical user interface (GUI) on a client device, the GUI configured for entering on the network server parameters for the secondary fantasy sports game;
    receiving, on the network server, from the client device, parameters defining the secondary fantasy sports game, wherein the parameters comprise:
        a selection of at least one player assigned to the first participant and at least one player assigned to the second participant,
            wherein the selection of players assigned to each participant is not limited by players assigned to each participant in the primary fantasy sports game in the fantasy league; and
        a value of consideration placed between the first and second participants for the secondary game;
    establishing access to an electronic data feed of real-life sports data to the network server, the data feed providing a value of a statistic related to each player of the selection of players;
    determining, by using a processor of the network server for evaluating the received value of the statistic for each of the one or more players, a winner and a loser of the secondary game from the among the first and second participants, based on a comparison of the value of the statistic received from the electronic data feed, wherein determining the winner and loser of the secondary fantasy sports game is independent of the primary fantasy sports game;
    generating an electronic alert for transmission to the client device, the electronic alert indicating the determined winner and loser; and
    automatically reconciling the value of consideration by electronically communicating with the account server to electronically transfer the value of consideration between the determined loser and the determined winner.

2. The method of claim 1, wherein the data feed provides the statistic in substantially real-time.

3. The method of claim 1, wherein the secondary game is between two participants.

4. The method of claim 1, wherein each fantasy player has a corresponding position designation, and wherein the selection of the at least one player assigned to each of the first participant and the second participant is without regard to a position requirement.

5. The method of claim 1, wherein the parameters further comprise a time period during which performance of the selection of players is measured against the statistic.

6. The method of claim 5, wherein the time period is for more than a time period for the primary fantasy sports game.

7. The method of claim 5, wherein the time period is for less than a time period for the primary fantasy sports game.

8. The method of claim 5, wherein the time period covers one real-life game for each player.

9. The method of claim 5, wherein the time period includes at least two non-consecutive games in the fantasy season for the primary fantasy sports game.

10. The method of claim 1, wherein the at least one player assigned to the first participant is different from the at least one player assigned to the second participant.

11. The method of claim 1, wherein the client device is a client device of a first participant, the method further comprising:
    transmitting the parameters received from the client device of the first participant to a client device of the second participant;
    providing a GUI on the client device of the second participant, the GUI configured for entering acceptance of the parameters by the second participant;
    receiving on the network server confirmation from the client device of the second participant regarding the parameters;
    registering on the network server the secondary game upon the confirmation from the second participant; and
    initiating the data feed for each player of the selection of players.

12. The method of claim 1, wherein the client device is a client device of a first participant, the method further comprising:
    transmitting the parameters on the network server to a client device of the second participant;
    providing a GUI on the client device of the second participant, the GUI configured for entering amendments to the parameters by the second participant;
    receiving on the network server a modification to the parameters from the client device of the second participant;
    transmitting the modification of the parameters to the client device of the first participant;

providing a GUI on the client device of the first participant, the GUI configured for entering acceptance of amended parameters;

receiving on the network server confirmation from the client device of the first participant regarding the parameters;

registering on the network server the secondary game upon the confirmation from the first participant; and initiating the data feed for the selection of one or more players in the secondary game.

13. The method of claim 1, wherein the value of consideration for the secondary game is less than a cost for entry into the fantasy league.

14. The method of claim 1, wherein the fantasy league is hosted on a second network server configured to share information related to the primary fantasy sports game to the network server.

15. A fantasy sports game system, comprising:
at least one network server;
a graphical user interface accessible through one or more client devices allowing input of the game to the network server and configured to communicate with the network server;
an account server integrated with the network server, the account server having an account for each of two or more participants;
a data feed functionally integrated with the network server, the data feed providing measurement data;
an electronic game provided through the graphical user interface, the game having a capacity for the two or more participants, each participant having access to the game through the one or more client devices, and competing for a mutually exclusive outcome based on a performance of one or more fantasy players assigned to each participant, a winner participant having a higher performance of the one or more assigned fantasy players among the two or more participants, the game comprising;
  the one or more fantasy players assigned to each participant;
    wherein the fantasy players correspond to players in a sport;
    wherein the one ore more fantasy players assigned to each participant is not limited by a requirement to meet a player position requirement or a requirement to fill a fantasy roster;
  measurement data received by the network server relating to the performance of each of the one or more fantasy players;
  a conversion factor to transform the measurement data to a fantasy value by applying the conversion factor to the measurement data, the fantasy value calculated by the network server for each player;
  a consideration value placed at risk based on an outcome of the game;
  an aggregation of the fantasy value for each player assigned to each participant;
  a determination of a winner participant by the network server based on such aggregated fantasy values;
an alert component related to the determination of the winner participant, wherein such alert component informs the first and second participants of the winner and a loser; and
an account module in communication with the account server and network server, the account module configured to automatically reconcile the consideration value by providing instructions to transfer the value to the account of the winner from the account of the loser.

16. The system of claim 15, wherein the sport is selected from a group consisting of basketball, baseball, football, and hockey.

17. The system of claim 16, wherein the sport is football and wherein each of the one or more fantasy players assigned to each participant includes a different player position.

18. The system of claim 15, wherein the game further comprises a time period in which the measurement data is applicable, wherein the time period is comprised of one or more real-life games.

19. The system of claim 18, wherein the time period is selectable by one or more of the two or more participants.

20. A non-transitory computer readable medium comprising a plurality of instructions that, when executed by at least one processor, cause the at least one processor to:
provide an electronic fantasy sports game through a first graphical user interface (GUI) instance, wherein the game has capacity for two or more participants competing for one of two or more mutually exclusive outcomes based on a performance of one or more fantasy players assigned to each participant, and wherein the game has a plurality of selectable options for playing the game;
in response to a selection of the options for playing the game received from the first GUI instance, provide a plurality of fantasy sports players to the first GUI instance,
  wherein the fantasy players correspond to players in one or more sports; and
  wherein each fantasy player has a measurable performance and a player position;
in response to receiving a first selection of one or more players from the plurality of fantasy sports players, assign the first selection of one or more players to a first participant,
  wherein the first selection of one or more players assigned to the first participant is not limited by a requirement to meet a player position requirement or a requirement to fill a fantasy roster;
in response to receiving a second selection of one or more players from the plurality of fantasy sports players, assign a second selection of one or more players to a second participant,
  wherein the second selection of one or more players assigned to the second participant is not limited by a requirement to meet a player position requirement or a requirement to fill a fantasy roster;
in response to the assignment of players to the second participant, provide to the first GUI instance a plurality of options for a value of consideration placed at risk;
in response to receiving a selected value of consideration, provide to a second GUI instance an option to modify the selection of one or more players assigned to the first and second participants and the value of consideration;
receive from the first GUI instance and the second GUI instance an instruction to complete the selectable options;
determine, on a computer system and from a data feed, a fantasy value for each player assigned to the first and second participants based on performance of such player;
determine, on the computer system, an aggregation of the fantasy values for each player assigned to each participant; and determine, on the computer system, a winner participant based on the aggregated fantasy values, the winner participant having a higher aggregation of fantasy value of the one or more fantasy players among the two or more participants; and
automatically reconcile the selected value of consideration to the winner participant from the loser participant.

\* \* \* \* \*